(12) United States Patent
Jacobson et al.

(10) Patent No.: US 7,539,191 B1
(45) Date of Patent: May 26, 2009

(54) SYSTEM AND METHOD FOR SECURING ROUTE PROCESSORS AGAINST ATTACK

(75) Inventors: Van Jacobson, Woodside, CA (US);
Kedar Poduri, Santa Clara, CA (US);
Satish K Kanna, San Jose, CA (US);
Cengiz Alaettinoglu, Sherman Oaks, CA (US)

(73) Assignee: Packet Design, Inc., Santa Clara, CA (US)

( * ) Notice: Subject to any disclaimer, the term of this patent is extended or adjusted under 35 U.S.C. 154(b) by 1031 days.

(21) Appl. No.: 10/317,917

(22) Filed: Dec. 12, 2002

(51) Int. Cl.
*H04L 12/56* (2006.01)
(52) U.S. Cl. .................................. 370/392; 370/401
(58) Field of Classification Search ................. 370/392, 370/400, 401, 465, 395.31, 389; 713/153, 713/154, 160, 161
See application file for complete search history.

(56) References Cited

U.S. PATENT DOCUMENTS

| | | | |
|---|---|---|---|
| 6,944,168 B2* | 9/2005 | Paatela et al. ............... | 370/401 |
| 6,950,424 B2* | 9/2005 | Galand et al. ............... | 370/351 |
| 6,973,102 B2* | 12/2005 | Karagiannis et al. ........ | 370/516 |
| 7,031,310 B2* | 4/2006 | Ando et al. ................. | 370/392 |
| 7,032,031 B2* | 4/2006 | Jungck et al. ............... | 709/246 |
| 7,120,792 B1* | 10/2006 | Jacobson et al. ............ | 713/153 |
| 7,139,242 B2* | 11/2006 | Bays .......................... | 370/238 |
| 2002/0024934 A1* | 2/2002 | Galand et al. ............... | 370/238 |
| 2003/0046390 A1* | 3/2003 | Ball et al. ................... | 709/224 |
| 2003/0123465 A1* | 7/2003 | Donahue ..................... | 370/401 |
| 2003/0200463 A1* | 10/2003 | McCabe ...................... | 713/201 |
| 2004/0044786 A1* | 3/2004 | Basso et al. ................. | 709/238 |
| 2006/0029104 A1* | 2/2006 | Jungck ........................ | 370/498 |

* cited by examiner

*Primary Examiner*—Brian D Nguyen
(74) *Attorney, Agent, or Firm*—Innovation Partners; Charles E. Gotlieb

(57) ABSTRACT

A system and method impedes attacks on route processors in an autonomous system using one device with a routable IP address that checks the format of routing messages and forwards them to one or more route processors without routable IP addresses.

18 Claims, 13 Drawing Sheets

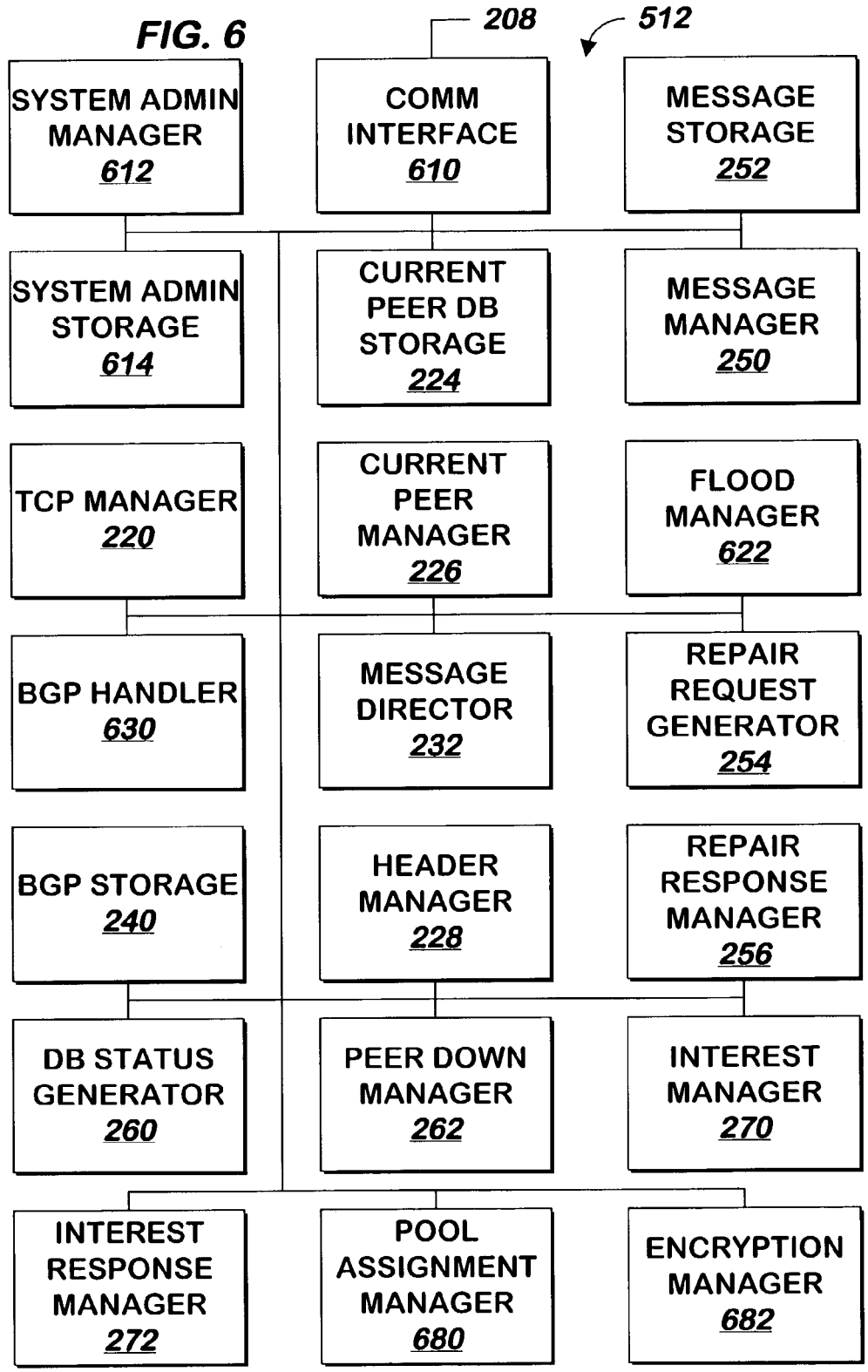

SYSTEM AND METHOD FOR SECURING ROUTE PROCESSORS AGAINST ATTACK

RELATED APPLICATIONS

This application claims the benefit of application Ser. No. 60/420,097 entitled "Method and Apparatus for Securing Route Processors Against Attack" filed on Oct. 21, 2002 by Van Jacobson, Kedar Poduri, Satish Kanna and Cengiz Alaettinoglu and is a continuation-in-part of U.S. patent application Ser. No. 10/206,715 entitled "System and Method for Communicating Routing Information" filed on Jul. 26, 2002 by Van Jacobson, Kedar Poduri, Satish Kanna, and Cengiz Alaettinoglu, which claims the benefit of U.S. Provisional Patent Application Ser. No. 60/308,174, entitled, "METHOD AND APPARATUS FOR ALLOCATING (I) BGP MESSAGES TO ONE OF SEVERAL PROCESSORS" filed on Jul. 26, 2001 by Van Jacobson, Kedar Poduri, and Cengiz Alaettinoglu, U.S. Provisional Patent Application Ser. No. 60/308,156, entitled, "METHOD AND APPARATUS FOR PROCESSING (I) BGP MESSAGES" filed on Jul. 26, 2001 by Van Jacobson, Kedar Poduri, and Cengiz Alaettinoglu, and U.S. Provisional Patent Application Ser. No. 60/308,333, entitled, "METHOD AND APPARATUS FOR REDUNDANT ROUTE PROCESSING" filed on Jul. 26, 2001 by Van Jacobson, Kedar Poduri, and Cengiz Alaettinoglu having the same assignee as the present application and each is incorporated herein by reference in its entirety.

FIELD OF THE INVENTION

The present invention is related to communication systems and more specifically to communication systems for processing network management information.

BACKGROUND OF THE INVENTION

Conventional communication networks such as the Internet may be made up of several interconnected autonomous systems. An autonomous system is a network under administrative control of a single entity, such as a conventional Internet Service Provider, or ISP.

Certain topology and routing information is exchanged via routers at the edge of adjacent autonomous systems by means of the conventional BGP protocol. To send BGP information from one AS to another, a conventional TCP/IP connection is established between edge routers of each autonomous system and BGP information is exchanged over that connection. The TCP/IP connection uses an address that is "routable", or reachable from any other autonomous system in the network. In contrast, for security reasons, routers in an autonomous system that are not on the edge of the autonomous system have addresses that are "unroutable". An unroutable address is an address that can be accessed only from within an autonomous system, causing it to be more secure than routable addresses.

Devices with routable addresses are subject to attacks from unauthorized individuals. Thus, edge routers are subject to attack. One type of attack is to cause a buffer overflow that can then cause the device to execute code that communicates with the unauthorized individual's computer system. If the device has a routable IP address, it is subject to this type of attack and potentially others.

If a device has no routable IP address, but is in the same autonomous system as a device that does have a routable IP address, if the device that has a routable IP address will forward various messages to the devices with unroutable IP addresses, an unauthorized individual may set up a tunnel between the device with the unroutable IP address and the device with the routable IP address and send communications through the tunnel in order to take over the operation of the device with the unroutable IP address. Thus, any device that has a routable IP address can cause vulnerabilities in the other devices.

What is needed is a system and method that can communicate BGP information without exposing any devices that communicate BGP information, or the devices to which they are connected, to attack.

SUMMARY OF INVENTION

A system and method fronts unroutable devices with a device using a virtual IP address. The system and method forwards messages addressed to the virtual address to devices with unroutable IP addresses only if the messages are valid messages of a type and format that is expected, such as only forwarding (E)BGP messages. The devices that have unroutable IP addresses will thus not receive messages that can be used in an attack. If the system and method will forward different messages to a different one of the devices with unroutable IP addresses, an attacker may not be able to provide sufficient communications with any single device to launch an attack, even if he can take control of the device with the virtual address.

BRIEF DESCRIPTION OF THE DRAWINGS

FIG. 6 is a block schematic diagram of an apparatus for providing messages according to another embodiment of the present invention.

FIG. 14 is a flowchart illustrating a method of processing (E)BGP messages according to one embodiment of the present invention.

DETAILED DESCRIPTION OF A PREFERRED EMBODIMENT

Figure 1:
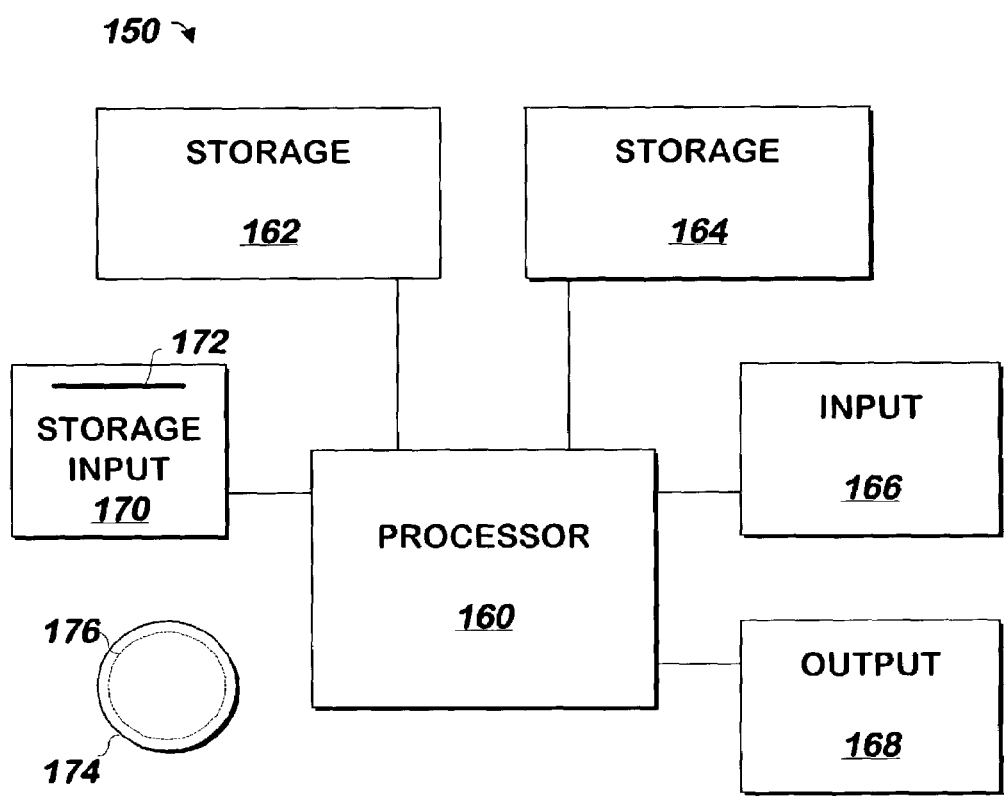
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the Solaris operating system commercially available from SUN MICROSYSTEMS of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT CORPORATION of Redmond Wash. or a MACINTOSH computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. although other systems may be used.

Figure 2:
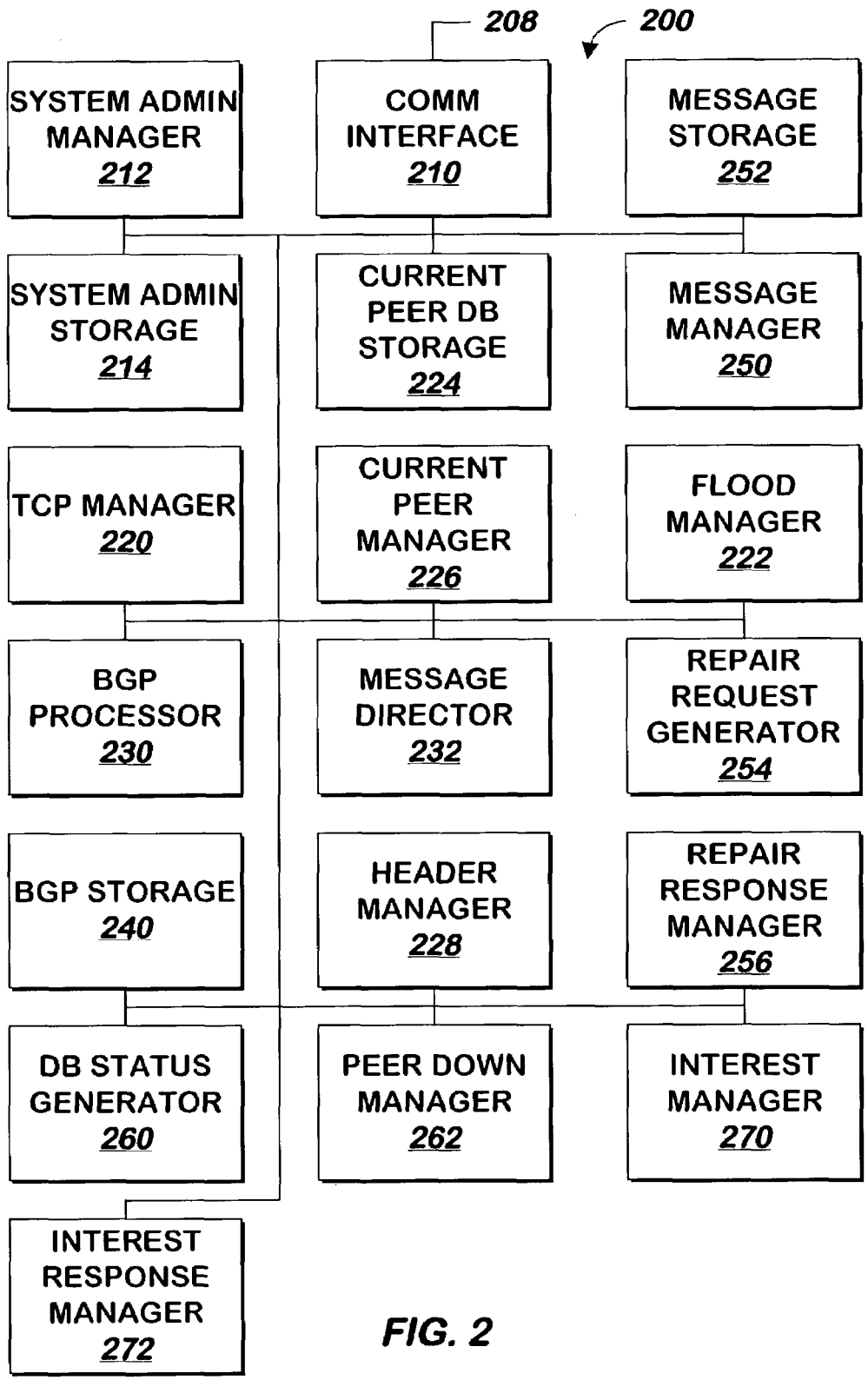
FIG. 2 is a block schematic diagram of a system for processing routing messages according to one embodiment of the present invention.

Referring now to FIG. 2, a system for processing routing messages is shown according to one embodiment of the present invention. In one embodiment, all communication into or out of system 200 is made via input/output 208 of communication interface 210 which is coupled to a network such as the Internet or a local area network or both. Communication interface 210 is a conventional communication interface that supports TCP/IP, SCTP, UDP or other conventional communication protocols.

In one embodiment, when system 200 initializes, system 200 contacts or is contacted by, various devices in the autonomous system (not shown) in order to initiate a series of BGP conversations using conventional BGP protocols, such as (E)BGP or (I) BGP. Although the devices are described as routers herein, in other embodiments, the devices may include routers, route reflectors or other devices. The various devices that system 200 communicates with or accepts communications from are identified by a system administrator providing to system administration manager 212 the IP addresses of those devices with which system 200 is to establish a BGP peering relationship, for example, via (I) BGP.

Communication with system administration manager 212 may be performed via communication interface 210, for example, by connecting to the IP address of system 200 using a port that corresponds to system administration manager 212. Communication interface 210 provides such communications to system administration manager 212 and receives and forwards replies from system administration manager 212 to the intended recipient via input/output 208.

System administration manager 212 provides a user interface via HTML and accepts commands including a command to add one or more IP addresses of such devices. System administration manager 212 stores the IP addresses in system administration storage 214.

BGP processor 230 includes a conventional BGP processor, such as a process running the conventional GateD BGP processor commercially available from NextHop Technologies, Inc., of Mountain View, Calif. and exchanges conventional (I) BGP communications between itself and the routers having IP addresses in system administration storage 214 and may receive other communications such as (E)BGP messages. In one embodiment, the communications include topology information such as conventional (I) BGP peering messages. BGP processor 230 may either initiate or receive and respond to such messages for routers that have an IP address in system administration storage 214 as described above. BGP processor 230 establishes, or responds to requests for, (I) BGP sessions with each such device, and begins to exchange sync information.

In one embodiment, BGP processor 230 provides outgoing (I) BGP peering messages to message director 232 for transmission. Message director 232 receives such (I) BGP peering messages from BGP processor 230 and routes them based on whether or not the destination IP address is a current peer. Messages to peers are provided via a flooding arrangement described in more detail below, and messages to non-peers are provided via a conventional TCP/IP connection with the non peer, in a manner similar to that used to send conventional (I) BGP messages by conventional routers. Message director 232 extracts the destination IP address from the header of each message, and searches for this address in current peer DB storage 224.

If message director 232 does not find this IP address in current peer DB storage 224 (which would be the case if current peer DB storage 224 were empty or if the two devices had never exchanged peering messages), the message is treated as though it is intended for a non-peer: message director 232 transmits this message to TCP manager 220 and communications manager 210 to the non-peer. TCP manager 220 establishes a conventional TCP/IP connection with the non-peer if one is not already established and sends the sync message via the connection between TCP manager 220 and the non-peer.

Had message director 232 found this IP address in current peer DB storage 226 then message director 232 would have forwarded the message to flood manager 222 as described below. In this case, no TCP/IP connection to the device would have been established or used.

According to the (I) BGP specification, after providing a sync message, BGP processor 230 will receive a sync message from the other border router via TCP manager 220 and communications interface 210. This message will be provided via conventional TCP/IP techniques. Each sync message follows another message that includes an initial set of routes, and consists of paths, prefixes, and masks that describe to which IP addresses the other router or device has access, and cost information. The cost information may include the number of AS hops it takes to get to the IP address from the other border router. BGP processor 230 receives the sync message and the prior message from TCP manager 220, stores (I) BGP messages in BGP storage 240 and calculates routes in a conventional manner of a router or a route reflector. If the system 200 is part of a device acting as a route reflector, route information may be provided to non-border routers as described below.

When the sync messages have been exchanged between (I) BGP processor and the other router, current peer manager 226 will send to the router from which the sync message was received a BST_PEER_SYNC message via TCP manager 220 and communications interface 210. In one embodiment, the determination of whether sync messages have been exchanged is made by BGP processor 230, which signals current peer manager 226. In another embodiment, current peer manager 226 monitors all communications to and from BGP processor 230 and watches for the exchange of sync messages.

If the other router has the capabilities described below to accept and provide BGP messages such as (I) BGP messages via a flooding mechanism, that router will respond to the BST_PEER_SYNC message. If not, the other router will ignore the BST_PEER SYNC message as it would another message that it does not understand. If the other border router replies with a (I) BGPS_PEER_SYNC of its own; if current peer manager 226 monitors such communications, it will receive the BST_PEER_SYNC message, and if not, BGP processor 230 will receive the message and signal current peer manager 226. In response to either type of event, current peer manager 226 marks the other border router as a BST peer by adding its IP address to a table in current peer DB storage 224 and signals BGP processor 230 to close the TCP/IP connection to the other border router it specifies in the signal.

Current peer DB storage 224 is a table of IP addresses of peer (I) BGPS routers. In one embodiment current peer DB storage 224 is an in-memory table. In one embodiment current peer DB storage 224 is a conventional database such as MySQL or DB2.

When BGP processor 230 receives this signal from current peer manager 226, it signals TCP manager 220 to close the TCP/IP connection with the other border router specified by current peer manager 226 and, if a TCP/IP connection is not already open between BGP processor 230 and header manager 228, BGP processor 230 opens a connection to header manager 228. The procedure described herein will be repeated for the other routers in the list of routers in system administration storage 214.

When current peer manager 226 enters the IP address of the other border router into current peer database storage 224, the other border router has established itself as a peer with system 200, and otherwise, the border router may remain as a non-peer. If sync messages are exchanged at a future time, for example, after communications are interrupted and reestablished, the process of identifying whether the other router is a peer, and if so, establishing it as a peer, will take place.

At any time after sync messages are exchanged, BGP processor 230 may desire to send (I) BGP maintenance messages to the other border routers. BGP processor 230 originates this message in accordance with the conventional (I) BGP protocol, and sends one such message for each TCP/IP connection it has open.

As described above, in one embodiment, those routers that are not listed as current peers have their own TCP/IP connections. (I) BGP messages sent over these connections by BGP processor 230 are forwarded via the TCP/IP connection with that peer. Messages sent via the TCP/IP connection to header manager 228 have their TCP/IP headers removed by header manager 228 and the remainder of the message is sent to flood manager 222.

In the above description, BGP processor 230 may be a conventional route processor such as would be found in a route reflector, but modified as described herein. For example, as described above, BGP processor 230 may signal current peer manager 226 when both sync messages have been received, may close the TCP/IP connection when signaled by current peer manager as described above, and may send update messages for each TCP/IP connection as described above, instead of sending one message per other router with which it has exchanged sync messages as described above.

However, if it is not possible or undesirable to modify BGP processor 230 as described herein, instead of setting up a TCP/IP connection between BGP processor 230 and header manager 228 and setting up a TCP/IP connection with non-peer routers, one TCP/IP connection may be arranged for each other router in the list of routers in system administration storage 214. All such TCP/IP connections are passed through message director 232 in the manner of a buffer. Current peer manager 226 monitors the connections as described above, and after a router is added to the list of current peers as described above, current peer manager 226 signals TCP manager 220 to terminate the TCP/IP connection, and signals message director 232, which simulates the appearance to BGP processor 230 that the TCP/IP connection remains open. TCP/IP connections with non peers actually remain open, though they continue to pass through message director 232.

When a TCP/IP message arrives from BGP processor 230, message director 232 compares the destination IP address in the message (or uses the connection over which the message is being sent to identify the destination IP address and compares this IP address) with the list of current peers in current peer database storage 224. If the destination address is not on the list of current peers, message director 232 passes the message via TCP manager 220 and communication interface 210 to the other router using the TCP/IP connection with the router corresponding to that destination address.

If the destination address is on the list of current peers, message director 232 passes the message to header manager 228. Header manager 228 removes the TCP/IP header from messages it receives and provides the message to message manager 250.

Message manager 250 compares the contents of the message to the contents of other messages received from flood manager 222 it has recently stored. If the contents of the message do not match the contents of such a message recently stored in message storage 252 (which may be conventional memory or disk storage, and may include a database, such as any of those described herein) message manager 250 stores the message in message storage 252 and provides the message to flood manager 222 and flood manager 222 adds a common header to the message and provides the message to its neighbor routers as described above. If the . . . contents of the message match the contents of a message stored in message storage 252, message manager 250 does not provide the message to flood manager 222, and so the message is not provided by flood manager 222. This procedure can prevent messages having identical contents that are intended for different routers from being flooded more than once in response to those messages and may be used in the embodiment in which BGP processor 230 uses one connection per device with which it communicates.

In one embodiment, flood manager 222 adds a header to messages it provides as described herein using a specific format, although other formats may be used by the present invention. Part of this reformatting may include building a header or otherwise encapsulating the message to correspond to the requirements of the transport protocol used, such as SCTP.

It is noted that although SCTP is used as a transport for flooding messages in one embodiment, other embodiments may use other protocols, such as UDP. If UDP is used, the rate of outgoing messages may be limited by communication interface 210.

Figure 3:
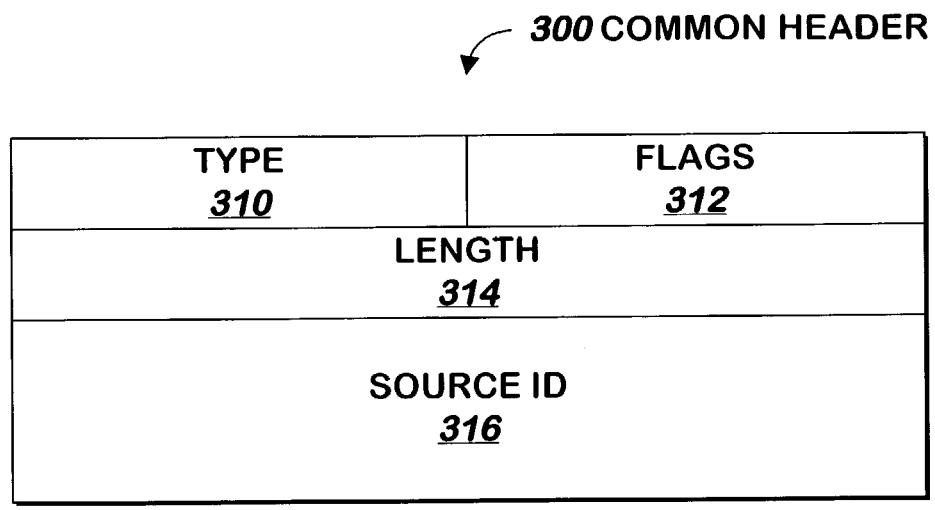
FIG. 3 is a block diagram of a common header of a message used for flooding according to one embodiment of the present invention.

In one embodiment, flood manager 222 builds and appends to each message it sends a common header, shown in FIG. 3. Referring momentarily to FIGS. 2 and 3, the common header 300 contains an eight bit type field 310, followed by an eight bit set of flags 312, which is followed by a sixteen bit length field 314 specifying the length of the entire message, including the header. Following the length field 314, a thirty two bit source identifier 316, which unless otherwise specified is the IP address of the device that originally sent the message, is provided.

In one embodiment, the type field 310 specifies the type of the message, with a type of 0 specifying the message contains data, 1 specifying the message contains a repair request, 2 specifying the message contains database status, 3 specifying the message reporting one or more peers are down, and, 4 specifying the message contains database synchronization information, each of which will now be described.

Figure 4:
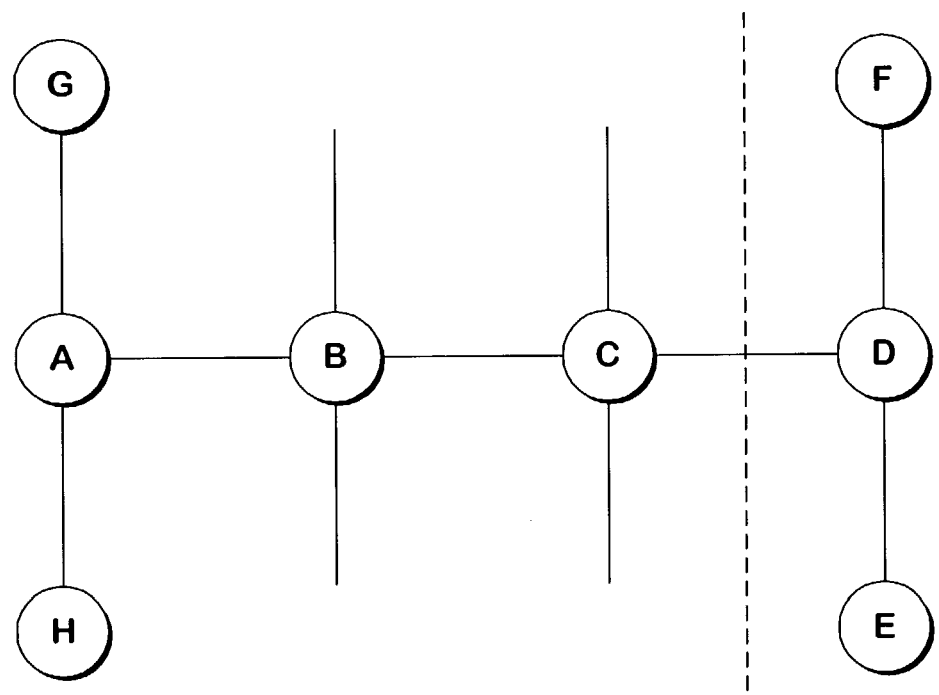
FIG. 4 is a diagram of a network of routers A through H.

Referring again to FIG. 2, flood manager 222 adds a common header described below to all content it receives and sends them via conventional flooding techniques so that they may be received by all routers capable of receiving the flood messages. Conventional flood techniques may include transmitting the message to all of the "neighbor routers" of the system 210. As used herein, a "neighbor router" is a router to which communication interface 210 is directly connected. An other router is directly connected to communication interface 210 if communication to that router need not pass through any other router to reach the neighbor router. Referring momentarily to FIG. 4, showing a network of routers A-H, routers G, H and B are the only neighbor routers of router A. Referring again to FIG. 2, in one embodiment, input/output 208 contains more than one physical input/outputs, each connected to a neighbor router. If desired, communication interface 210 is made up of several conventional physical communication interfaces, each meeting some or all of the criteria for communication interface 210 described above.

In one embodiment, when header manager 228 removes a header as described above, the result is the "content" of a data message. Flood manager 222 builds a common header with a type equal to zero and adds a thirty two bit sequence number following the common header and appends the data following the sequence number to build a data message. In one embodiment, the data comprises the content of one or more conventional (I) BGP messages and may be received from BGP processor 230 or otherwise as described herein. The sequence number is a number that is incremented by the number of bytes in the message for each message that has a source identifier corresponding to system 200. Flood manager 222 maintains a counter of each such message it sends, adds the number of bytes in the message to the counter and includes the value of the counter as the sequence number.

In one embodiment, to flood a message, flood manager 222 builds one message for each neighbor device with each such message being otherwise identical except for the address of the neighbor device and provides the messages to communication interface 210. Communication interface 210 handles congestion control and avoidance, and adds protocol specific headers, corresponding to the protocol used, e.g. SCTP. The addresses to use for each of the neighbor devices may be configured via system administration manager 212 and stored in system administration storage 214 or may be discovered by communication interface 210 and stored in system administration storage 214. Flood manager 222 uses these addresses in system administration storage 214 to generate the messages.

Each other router to which messages are flooded contains some or all of the elements of system 200. Any of those other routers, having received a data message from system 200, or system 200, having received a data message from any of its neighbor routers, process data messages as will now be described.

Communications interface 210 passes all flood messages received from other devices to flood manager 222. Flood manager 222 receives the message and examines it. If the message has the same source identifier as system 200, such source identifier being stored by a system administrator in system administration storage 214 using system administration manager 212 in a manner similar to that described above, flood manager 222 ignores the message.

Otherwise, flood manager 222 provides the message to message manager 250. Message manager 250 compares the source identifier and sequence number of the message with other messages stored in message storage 252 having the same source identifier as the message it receives. If the message matches a message stored in message storage, message manager 250 so indicates to flood manager 222, which discards the message. In one embodiment, if a special flag is set in the common header of the message, even if the message is stored in message storage 252, message manager 250 will treat the message as not matching a message stored in message storage 252 as described below.

If the message does not match a message stored in message storage 252, message manager 250 stores the message in message storage 252 and indicates to flood manager 222 that the message was not previously stored in message storage 252. In this case, flood manager 222 floods the message by providing via communication interface 210 the message to other neighbor routers other than the neighbor router from which the message was received as described above, provides it to header manager 228, which removes the common header and sequence number, reformats the message as a TCP/IP message and provides it to BGP processor 230 via the TCP/IP connection it has with BGP processor 230 or provides it to message director 232 which provides it via the simulated connection corresponding to the source identifier of the message it has with BGP processor 230. BGP processor 230 processes the message in a conventional manner, such as that which would be performed by a conventional route reflector. In one embodiment, these forwarding functions are performed as a background task.

In one embodiment, message manager 250 stores the last "n" messages it has received; in such embodiment "n" is 200 or any other number higher or lower than 200. In the embodiment in which n is 200, when message manager 250 receives its 201$^{st}$ message, message manager 250 overwrites the oldest message in message storage 252.

In one embodiment message manager 250 examines message storage 252 whenever a new message is received, and deletes from message storage 252 any old messages having the same source identifier and advertising a different route to the same destination as in the new message. This way, message storage 252 is made more efficient in that prior messages advertising out of date routes do not remain in message storage, thereby preventing older, but still up to date messages from being pushed out of message storage 252.

As message manager 250 receives data messages from other sources, it stores them in message storage 252 as described above. As it stores them, it compares the sequence number of the message less the number of bytes in the message with the highest sequence number of any prior message it received from the same source. If there is a gap in the sequence numbers, a message is missing. In this case, message manager 250 sends to repair request generator 254 the range of missing sequence numbers and the source identifier of the device from which the messages corresponding to the gap should have been received.

Repair request generator 254 builds the contents of a repair request message, to which flood manager 222 can add the common header to build a message to be sent to all of its neighbors. The contents of a repair request message includes a thirty two bit source identifier of the device from which the missing messages should have been sourced, followed by a sixteen bit number of gaps the sender is trying to fill (which could be more than one if, for example, only intermittent messages from a source are received before the gaps are filled), followed by sixteen bits of unused zeros or ones, followed by, for each gap, a thirty two bit starting sequence number of the gap and a thirty two bit ending sequence number of the gap until all of the gaps are so specified. Repair request generator 254 internally stores the contents of the message and also provides it to flood manager 222, which builds a common header as described above, appends the contents to it, and floods the message to its neighbors. Because the message is received from repair request generator, flood manager 222 uses a type of "1" in the common header.

Before performing the actions described above, repair request generator 254 checks its internal storage prior to building the message contents. If another set of contents previously generated for the same source identifier is internally stored by repair request generator 254, it increments the number of gaps stored in the request, appends the beginning and ending sequence number of the gap it receives from message manager 250 to the set of contents in order to build a new content for a new message, which it uses to replace the old content of that message. If the new gap would be contiguous to the last gap in the content, instead of incrementing the number of gaps and adding the beginning and ending sequence numbers of the gap, repair request generator 254 replaces the ending sequence number of the gap with the one it receives. Repair request generator 254 sends the new content to flood manager 222, which builds a common header, appends the content to it and sends the common header and content as a message to its neighbors.

In one embodiment, a repair request period is established by a system administrator using system administration manager 212 and stored in system administration storage 214 in a manner similar to other information stored there as described above. Repair request generator 254 sends only one content to flood manager 222 to be sent to neighbors during any repair request period. Any others are queued until a following request period using conventional techniques. If no response is received to a repair request message, repair request generator 254 may resend the identical contents to flood manager 222 to be sent out as another repair request message to its neighbor.

When a repair request is received, flood manager 222, in response to identifying the type of message as "1", routes the contents of the message and the source identifier of the sender of the repair response message to repair response manager 256. Repair response manager 256 checks message storage 252 for messages with sequence numbers from the source specified in the repair response message. If the repair request cannot be fulfilled from the messages in message storage 252, repair response manager 256 internally stores the request and sends the highest sequence number of the repair request and the source identifier of the device from which the messages are being requested in the repair request message to message manager 250.

Message manager 250 then identifies the highest sequence number stored in message storage 252 from the source it receives, and compares it to the highest sequence number it receives from repair response manager 256. If the sequence numbers are different, message manager 250 adds one to the highest sequence number for that source stored in message storage 252, and provides that sequence number, the source identifier of the device from which the missing messages should have been received, and the highest sequence number received from repair response manager 256 to repair request generator 254, which incorporates the missing sequence numbers into a content of a new or existing repair request message as described above and sends it to flood manager 222 as described above.

When a repair response message, generated as described below, is received by flood manager 222, it provides it to message manager 250 in response to the type identifier in the message having a value of 0. Each repair response message contains the source identifier of the originator of the messages corresponding to the messages contained in the repair response message, as well as the message requested, exactly as it was originally sent.

If the message is already in message storage 252, message manager 250 discards the message. Otherwise, message manager 250 adds the messages in the repair response message to message storage 250, as if the messages had arrived in a data message from the source corresponding to the messages. The originator of the messages in a repair response message is the source identifier of the device that originally sent the messages via its own flood manager 222.

Periodically repair request generator 254 checks to see whether any or all of the messages corresponding to the repair request are stored in message storage 252. If all of the messages corresponding to the repair request are stored in message storage 252, repair request generator 254 discards the repair request. If some, but not all of the gaps have been filled, repair request generator 254 builds a new content for a repair request that omits the gaps or portions of the gaps that have been filled and alters the number of gaps accordingly.

Repair response manager 256 periodically verifies whether it can fulfill the request it internally stored using the messages in message storage 252 and if so, for each message requested, builds its own repair response message (which is identical to the original message), provides the repair response message to flood manager 222 and maintains a list of the sequence identifiers of the repair response messages it has provided that correspond to the request.

The repair response message includes the message source identifier of originator of the message, which may be different from the sender of the repair response message, the sequence number of the original message, and the message itself. The type of the message is 0, making the message appear as though it is being flooded from the originator of the message.

Flood manager 222 does not add the common header to the content of the repair response message in response to it being received from repair response manager 256. Flood manager 222 floods the repair response message to the neighbors of system 200.

Subsequent repair response messages may be received from other neighbor devices. In one embodiment, the contents of a repair response message are checked against the messages in message storage 252 prior to their storage by message manager 250 as described above. In such embodiment, if the messages in a repair response message are already in message storage 252, message manager 250 ignores the repair response message and takes no further action.

In one embodiment, repair request generator 254 timestamps all repair requests when it initially generates them, and if some or all of the gaps are removed from the request as described above, it updates the timestamp. Periodically, the timestamps are compared against the current time. If the difference between the timestamp and the current time is greater than a threshold (which may be provided by a system administrator using system administration manager 212 and stored in system administration storage 214) repair request generator 254 removes the request it stores and signals current peer manager 226 with the source identifier of the device. Current peer manager 226 removes the source identifier from the list of current peers in current peer database storage 224 and either sends, or signals BGP processor 230 to send (for example, by informing BGP processor 230 that synchronization has been lost), another sync request, and the process of establishing the other device as a current peer follows as described above.

In one embodiment, status messages are periodically sent by system 200 to its neighbors. Database status generator 260 periodically checks the messages in database storage 252 and builds the contents of a database status message. The contents includes the number of source identifiers from which messages are stored in message storage 252 and for each such source identifier, the source identifier and the highest sequence number of the messages stored in message storage 252 for that source identifier. Database status generator 260 provides the contents of the message to flood manager 222, which adds a common header to the message, including a type value of 2 in response to receipt of the content from database status generator 260.

When flood manager 222 receives such a message, flood manager passes the message to message manager 250 and passes the source identifier to peer down manager 262 in response to the type value of 2. Message manager 250 then compares the highest sequence numbers for each source identifier with the highest sequence numbers for the corresponding sources of messages stored in message storage 252. If the highest sequence number for a source identifier stored in message storage 252 is lower than the corresponding sequence number in the database status message, message manager 252 treats the difference as a gap and attempts to have it filled as described above.

Peer down manager 262 maintains in current peer database storage 224 the date and time of the most recent status message received from each of the current peers. Each time it is signaled by flood manager 222, peer down manager 262 updates the date and time in the entry in current peer database storage 224 corresponding to the source identifier received from flood manager 222.

Periodically, peer down manager 262 compares the current date and time to each of the dates and times in the entries in current peer database storage 224. If the difference exceeds a threshold, peer down manager 262 treats the peer as down.

If communication interface 210 receives an indication that a neighbor is down (e.g. an SCTP indication that the connection has been dropped), it will signal peer down manager 262 with the identifier of the neighbor. In this case, peer down manager 262 will also treat the peer as down.

To treat a peer as down, peer down manager 262 either signals message director 232 to terminate the TCP/IP connection between message director 232 and BGP processor 230, or removes the peer from current peer database storage 224. Peer down manager 262 also purges the entries in message storage 252 for that peer and signals BGP processor 230 to terminate the peer and establish synchronization (which will cause the peer status to be reattempted as well) with the peer as described above.

In addition, peer down manager 262 adds the identifier to the contents of a peer down message and increments a number of source identifiers in the contents of the message, internally stores it, and provides it to flood manager 222 for flooding to neighbor devices. In one embodiment, the content of a peer down message contains a 32 bit number of source identifiers of peers that are being identified as down, followed by the identifiers of each peer identified as down. When a peer is established as described above, current peer manager 226 provides the identifier of the peer to peer down manager 262, which removes the peer from the content it stores and decrements the number of source identifiers in the content it stores. If the number of source identifiers is greater than zero, peer down manager periodically provides the contents of the message to flood manager 222. The period may be set via a system administrator using system administration manager 212, which stores the period in system administration storage 214 as described above.

Flood manager 222 appends the common header to the content, with a type of 3 in response to the contents being received from peer down manager 262, and floods the peer down message to all of the neighbor devices not identified in the peer down message. The flood managers 222 in the neighbor devices will flood the peer down message to all of their neighbors (other than the neighbor from which the message was received), and suppress duplicates subsequently received, all as described above.

In one embodiment, when a peer is down, the peer is not removed from the list of peers in current peer database storage 224 as described above. Instead, it is marked as removed by peer down manager 262. Instead of resending the a sync message, an interest message is sent to the downed peer. An interest message indicates that one device is interested in receiving the information that would normally be included as a sync message. The sync message may be intercepted by message director 232 and the message is provided to interest manager 270. Interest manager 270 may then provide an indication that it is interested in receiving synchronization from the device by providing as a content the sync message to flood manager 222.

Flood manager 222 appends the common header to the message with a type of 5 and floods the message to its neighbors. Messages received by flood managers 222 in the neighbor devices compare the destination identifier of the device to their own identifier (which may be stored in system administration storage 214 via system administration manager 212 as described above) and if the identifiers do not match, that flood manager 222 will provide the message to message manager 250 to determine if the message has been previously received. If so, the message is suppressed, and if not, message manager 250 adds it to message storage 252 and signals flood manager 222, which floods the message to its neighbors other than the neighbor from which the message was received.

If the destination identifier matches the device's own identifier, the device is the device for which the interest message was intended, so flood manager 222 passes the message to interest response manager 272. Interest response manager 272 waits a configurable period of time and selects each message that it receives, and provides the content to message director 232, which provides the contents of the message (e.g. the sync message) to BGP processor 230 on a simulated TCP/IP connection with the device, as if it were received as described above or via the single TCP/IP connection to BGP processor 230 used for flood messages.

Message director 232 receives the sync messages provided by BCP processor 230 in response to these sync messages and provides them to interest response manager 272, which sends the first one as the content of a data message to flood manager 222, which appends the common header (with a type of 5 in one embodiment) and floods it as described above. Subsequent responses made by BGP processor 230 to the messages it collected while waiting and provides as described above are suppressed by interest response manager 272.

When a flood manager 222 in another device receives such a data message from communication interface 210, it provides it to message manager 228, which checks to see if the source identifier is marked in current peer database storage as being down. If so, instead of providing the message to message director as described above, it provides it to interest manager 270, which provides it to message director 232, which provides it to BGP processor 230 over the TCP/IP connection for the device or to the TCP/IP connection between BGP processor 230 and header manager 228. Interest manager 270 then unmarks the peer as down in current peer database storage 224.

Figure 5:
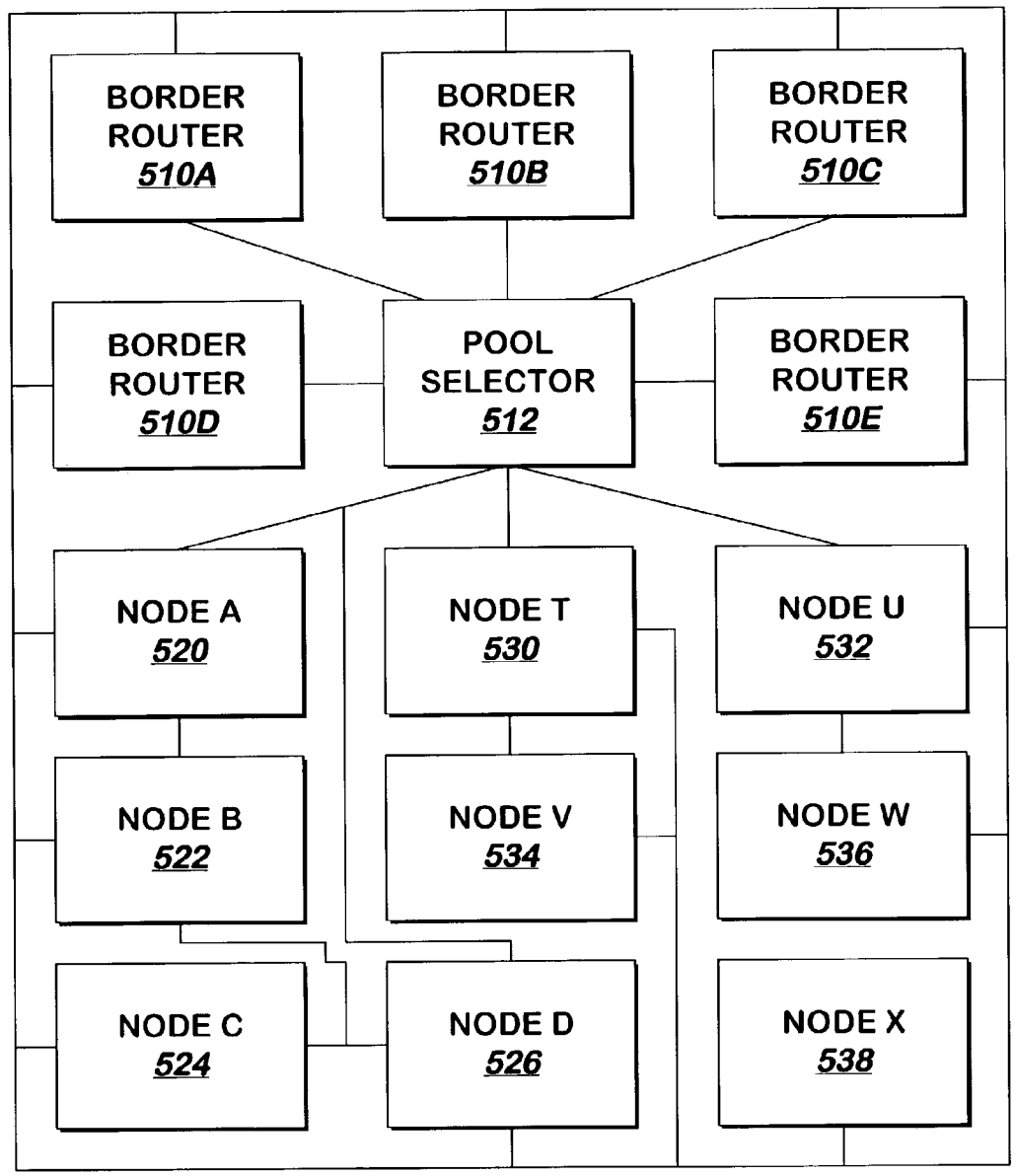
FIG. 5 is a diagram of a network of border routers, pool selectors and route processors according to one embodiment of the present invention.

A system containing elements similar to system 200 may be used to process (E)BGP messages in a fault-tolerant manner that provides load balancing across multiple route processors in one embodiment. Referring now to FIG. 5, a network of border routers, a pool selector and nodes of pools of route processors is shown according to one embodiment of the present invention.

Border routers 510A-E are conventional border routers running the conventional (E)BGP protocol. Border routers 510A-E may be in one AS or many autonomous systems, each such AS being different from an AS in which pool selector 512 and nodes 520-538 operate. Border routers 510A-E communicate with pool selector 512, which simulates to each such border router 510A-E the operation of another border router. Such operation includes responding to sync messages and the like.

In one embodiment, nodes 520-538 perform conventional route processing functions in addition to the functions described herein. Route processing functions include assembling route processing information from all available sources and identifying at least a portion of a least cost path over which communications can be forwarded, or identifying any portion of the information useful in doing so. Each node 520-538 is assigned to one of several pools of nodes. In FIG. 5, nodes 520-526 are assigned to one pool and nodes 530-538 are assigned to a different pool. The number of nodes 520-538 and pools and nodes 520-538 per pool may be any number, not just the specific number shown, and each pool may have a different number of nodes 520-236 from the other pools. The number of pool selectors 512 may also be greater than one, with border routers assigned to one or more pool selectors 512. If a border router 510A-E is assigned to more than one pool selector 512, the router may anycast the BGP information to each such pool selector 512.

FIG. 6 shows a pool selector 512 according to one embodiment of the present invention. Referring now to FIGS. 5 and 6, nodes 520-538 establish contact with BGP handler 630 in the same manner that the other devices established contact with BGP processor 230 as described above. Peer status is automatically established by current peer manager 226 when communication interface 610 reports a valid connection (e.g. via SCTP), and the peer status is stored in current peer database storage 224 as described above.

Border routers 510A-E communicate with pool selector 512 using the conventional (E)BGP protocol. A system administrator configures the IP addresses of the border routers 510A-E with which pool selector 512 is to communicate using system administration manager 612 as described above, and system administration manager 612 stores these addresses in system administration storage 614. System administration manager 612 and system administration storage 614 operate in a similar manner to system administration manager 212 and system administration storage 214. Each border router 510A-E communicates sync messages between itself and BGP handler 630 via individual TCP/IP connections between input/output 608 of communication interface 610, which are similar to input/output 208 and communication interface 210 described above. Subsequent communications are made between each border router 510A-E and BGP handler 630 via this same TCP/IP connection.

Unlike BGP processor 230, when sync is established with border routers 510A-E, no attempt is made to establish the border routers 510A-E as current peers nor are the individual TCP/IP sessions to the route processors 510A-E dropped. BGP handler 630 also makes no attempt to process routes received in any message from border routers 510A-E.

BGP handler 630 provides copies of all messages it receives from border routers 510A-E as the content of a data message to pool assignment manager 680. In one embodiment, the TCP/IP header received with the content is left as part of the message content, and so header manager 228 is not used, although it can be used in other embodiments to reformat the TCP/IP header into the content of the message. Pool assignment manager 680 optionally provides the content to encryption manager 682, which encrypts the content and provides it back to pool assignment manager 680.

Pool assignment manager 680 selects one of the pools to which subsequent communications from the border router 510A-E from which the message was received will also be assigned. The assignment may be made in response to pool assignments received with the IP addresses of the border routers 510A-E stored in configuration storage 614 as described above, or may be performed by balancing the number of assignments with an equal number assigned to each pool, a number assigned to each pool in proportion with the number of nodes 520-538 in the pool, or using any other conventional allocation technique. Pool assignment manager 680 internally maintains a table of assignments of border routers 510A-E to pools so that subsequent messages may be assigned to the same pool, although other embodiments dynamically allocate route processors to pools and stores the allocation in the table. Pool assignment manager 680 provides the content or encrypted content and an identifier of the pool to which it assigned the message to flood manager 622.

Flood manager 622 operates in a manner similarly to flood manager 222 except as noted herein. One difference in operation is that flood manager 622 provides data messages it receives with a unique type identifier that identifies the data message as a message that should be flooded by flood managers 722 described below only within the pool, and not to interfaces coupled to routers outside of the pool corresponding to the interface on which the message is received. In addition, flood manager 622 itself floods the message not to all of its neighbor routers, but only to neighbor routers assigned to the pool in system administration storage 614 corresponding to the identifier it receives with the content.

If communications with a border router 510A-E are interrupted (either because messages have not been received from the border router for a certain period of time or communication interface 610 reports to BGP handler 630 that the connection is lost), BGP handler 630 reports the IP address of that border router 510A-E to pool assignment manager 680, which removes the assignment for that border router 510A-E from its table.

Figure 7A:
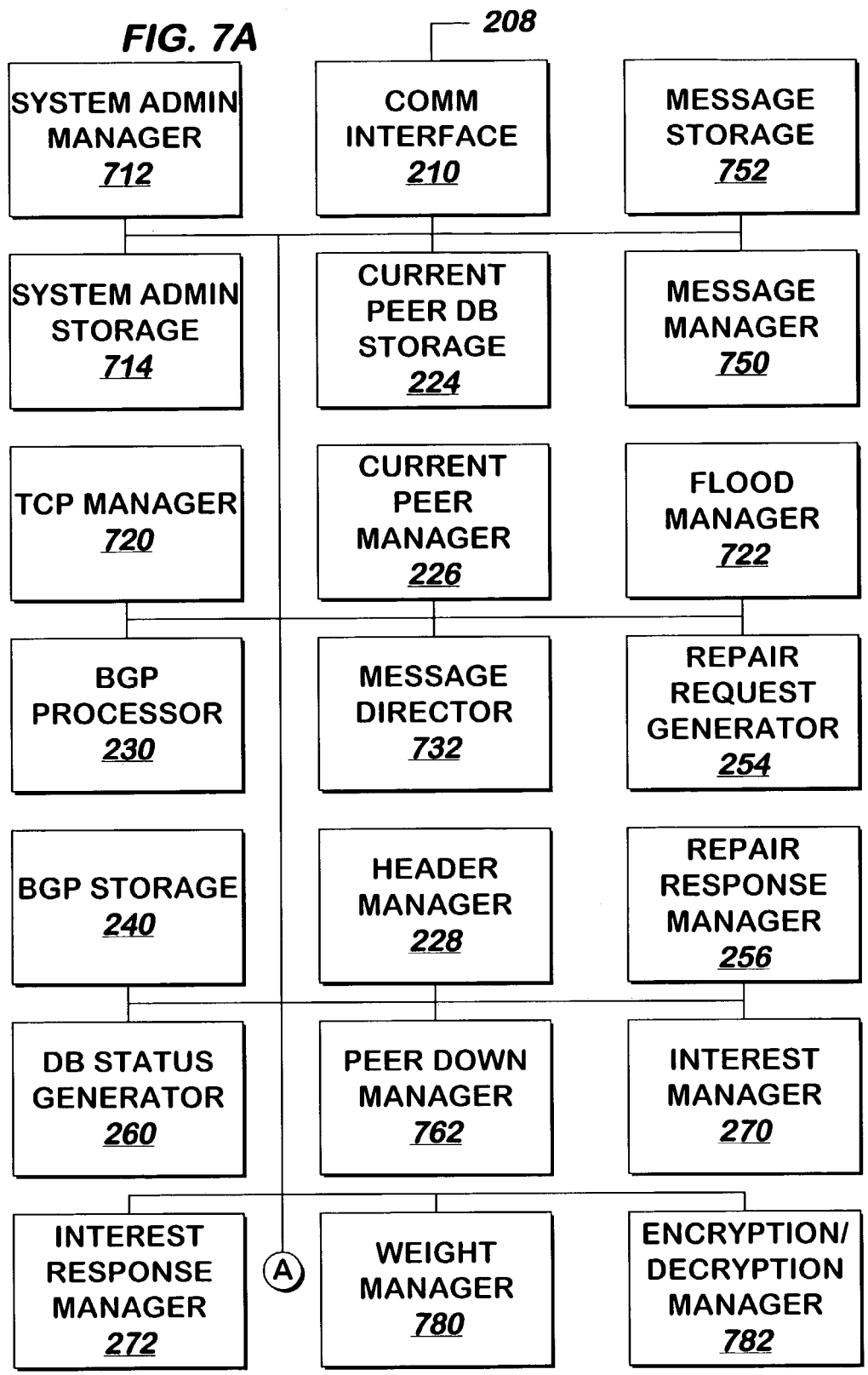
FIG. 7 is a block schematic diagram of an apparatus for providing messages according to another embodiment of the present invention.
Figure 7B:
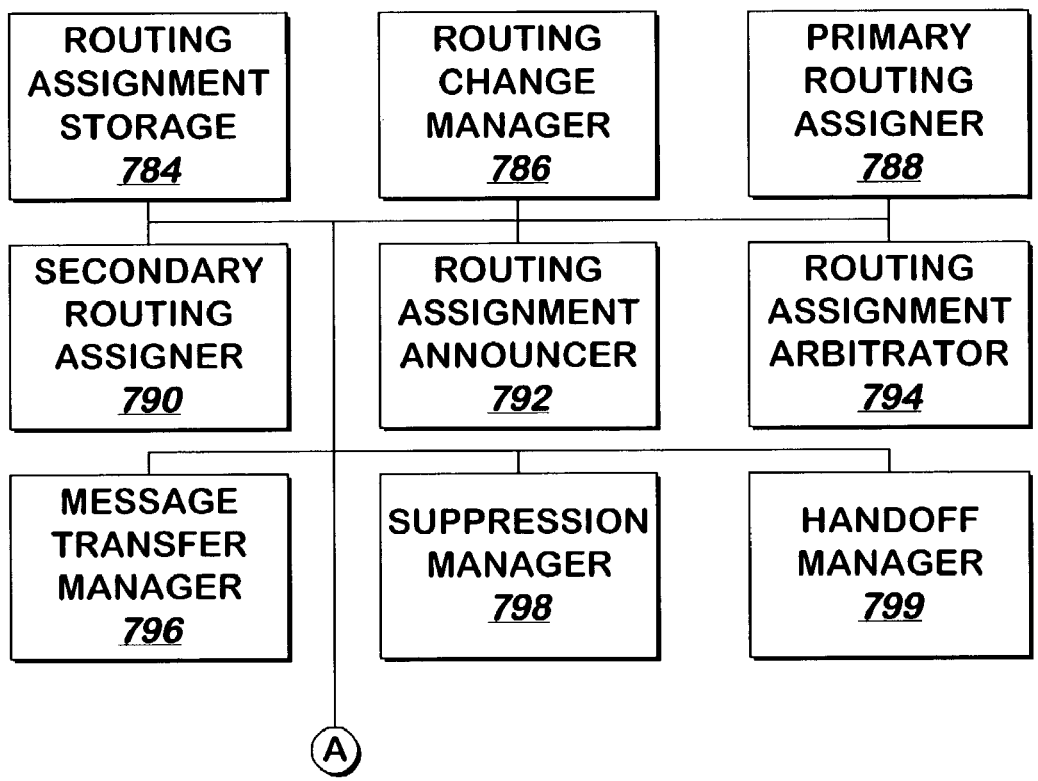
Figure 7:
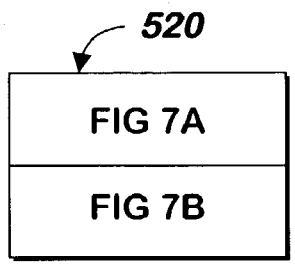

Each node 520-538 operates in a manner similar to system 200 except as otherwise noted below. Instead of processing (I) BGP messages, the nodes 520-538 process (E)BGP messages and elements described with reference to FIG. 2 process such (E)BGP messages in the same or similar manner as described with reference to FIG. 2, except as noted herein. FIG. 7 shows a representative node 520 of nodes 520-538. FIG. 7 is made up of FIGS. 7A and 7B, which are connected and have been split onto two sheets for space reasons. Elements of FIG. 7 numbered between 200 and 300 operate as described above. For example, node 520 may exchange (I) BGP information with other nodes 522-538 as described above.

Node 520 exchanges sync messages with other nodes in its pool 522-526 and pool selector 512, and establishes other nodes in the pool 522-526 and pool selector 512 as current peers as described above with reference to FIG. 2. Data messages corresponding to (E)BGP messages and having the unique type identifying them as to be flooded only within the pool received by node 520 from another node 522-526 in the pool or from pool selector 512 are optionally stored in message storage 752 (if not already stored there) by message manager 750, which operate as message storage 252 and message manager 250 except as noted herein, and flooded by flood manager 722, which operates as flood manager 252 except as noted herein, to the other nodes 522-526 in the pool as described above with reference to FIG. 2. In one embodiment, communication interface 210 provides the interface or other identifier of the device from which a message is sent, and flood manager 722 looks up the pool of the device in system administration storage 714, and refloods such a data message to other interfaces corresponding to neighbor devices assigned to that same pool (other than the device from which the message was received) in system administration storage 714. Data messages having other types are flooded to all neighbor devices as described above.

Some additional types of messages are also used, and these will now be described.

In one embodiment, weight manager 780 periodically provides a weight to be used as described below. The weight is proportional to the available capacity of the node 510 to be the primary or secondary route processor for additional border routers 510A-E, although any weight algorithm that assists in balancing the loads on each node 520-538 may be used in other embodiments. A node 520-538 is the primary or secondary route processor for a border router 510A-E if the node is calculating routes using raw, unprocessed data from that border router 510A-E. In one embodiment, the available capacity is a function of the number of border routers 510A-E for which the node 520 is operating as the primary or secondary route processor. This information is stored for each node in the pool in routing assignment storage 784 as described in more detail below. Weight manager 780 retrieves the identifier of the node 520 stored in system administration storage 714 via system administration manager 712 (each of which operate similarly to system administration storage 214 and system administration manager 212) and determines using routing assignment storage the number of border routers 510A-E for which it is the primary or secondary route processor. This number is subtracted from a capacity of border routers stored in system administration storage 714 via system administration manager 712 by a system administrator to arrive at the weight. The weight is provided to flood manager 722 by weight manager 780 as the content of a weight message.

System administration storage 714 also contains the IP addresses of border routers 510A-E of FIG. 5 and the addresses or interface identifiers of the other nodes 520-538 that are considered in the same pool as the node containing system administration storage 214 provided by a system administrator as described above.

Each node 520-538 floods a weight to the other nodes 520-538 in its pool. In a manner similar to that described above, each node 520-538 will receive flooded messages and will store them and forward them to its neighbors in the pool, except for the neighbor in the pool from which the message was received. The weight is flooded with a type in the common header that identifies the message as a weight message, along with a sequence number as described above. Flood manager 722, which operates similarly to flood manager 222 except as noted herein, receives the contents of the weight message from weight manager 780 (built as described in more detail below) and adds a common header and sequence number as described above. Because it was received from weight manager 780, flood manager 722 uses a type value indicating that the message is a weight message. Flood manager 722 optionally provides the contents of the message to encryption/decryption manager 782 for encryption via a secret shared key stored in the system administration storage 714, 614 of each node and pool selector 512, receives the encrypted contents from encryption/decryption manager 782 and provides the common header, sequence number and encrypted contents to the neighbor nodes in the pool. Neighbor nodes of a node are nodes that have a direct connection to that node. Flood manager 722 also provides the message to message manager 750, which operates in a manner similar to message manager 250 except as noted herein. Message manager 750 stores the message in message storage 752, which is similar to message storage 252, as described above.

The flood managers 722 in the neighbor nodes in the pool will receive the weight message. If the message has a source identifier equal to that specified for node 520 or is stored in message storage 752 (which is similar to message storage 252 except as noted herein), message manager 750 does not provide it to flood manager 722 for further flooding in the manner described above with reference to FIG. 2. Otherwise, message manager 750 stores the weight message in message storage 752 and provides it to flood manager 722, which floods the message to the neighbor nodes of the node that received the weight message other than the neighbor node that sent the message, provided the neighbor nodes are in the same pool as specified in system administration storage 714.

The source identifier of pool selector 512 is stored by a system administrator in system administration storage 714 using system administration manager 712. Flood manager 722 compares the source identifier of messages it receives with the source identifier of pool selector 512. When a data message arrives, flood manager 722 provides the messages to neighbor nodes other than the node from which the message was received. If the data message has a source identifier of pool selector 512, flood manager 722 provides the message to routing change manager 786, which optionally decrypts the message by providing it to encryption/decryption manager 782 and receives the decrypted contents.

Routing change manager 786 compares the IP address of the border router 510A-E to which the message corresponds, to the IP addresses of border routers stored in routing assignment storage 784. If the IP address of the border router is assigned to two nodes as primary and secondary route processors, routing change manager 786 discards the message. Otherwise, routing change manager 786 signals primary routing assigner 788 with the IP address of the border router 510A-E.

When so signaled, primary routing assigner 788 retrieves from message storage 752 the most recent weight messages from all of the nodes 520-526 that are current peers in current peer storage 224 in the same pool as the node, in this case 520, in which primary routing assigner 788 resides that are not marked as "down". Primary routing assigner 788 optionally provides each such message to encryption/decryption manager 782 for decryption, if necessary. Primary routing assigner 788 internally builds a table of the source identifier of each such node 720-726 and the most recent weight advertised by that node 720-726, with the table organized by ascending order of source identifier, although other orders may be used.

In one embodiment, a node advertising a weight higher than a threshold is removed from the table by primary routing assigner 788 to ensure that one node does not obtain a higher than proportional share of assignments. When weight manager 780 provides the weights as described above, weight manager 780 caps the weight at the threshold value prior to sending it as described above.

Primary routing assigner 788 then adds the weight of the first node 720-726 in the table to zero to provide an upper bound for that node and stores it in an upper bound column of the table, adds the weight of the second node to the upper bound of the prior node to obtain an upper bound for the second node and repeats this process for every node in the table. In one embodiment, the upper bound columns are each multiplied by a factor and stored into an adjusted upper bound column in the table to ensure that the upper bound for the last node in the table is the highest possible value of a hash function.

Primary routing assigner 788 then hashes a portion or all of the IP address of the border router 510A-E corresponding to the message from pool assigner 512 and uses the hash result as an index to the adjusted upper bound in the table to identify the lowest upper bound that exceeds the value of the hash result and selects that node. Any ties may be broken in a predictable way (which may be pseudo-random) so that all nodes 520-538 will break ties in the same manner. Primary routing assigner 788 adds an entry in the table in routing assignment storage 784 with the IP address of the border router corresponding to the message and the source identifier of the selected node as the primary route processor for that border router. Primary routing assigner 788 removes the entry corresponding to the selected node from the table it internally stores and provides the table so altered to secondary routing assigner 790, along with the decrypted message content and the hash result.

If the identifier of the node is the identifier of the node in which primary routing assigner 788 resides, primary routing assigner 788 signals routing assignment announcer 792 with the IP address of the border router 510A-E and provides the message to BGP processor 230.

When signaled, routing assignment announcer 792 provides the contents of a routing assignment message containing the IP address of the border router 510A-E and, because it was received from primary routing assigner 788, an indication that the message corresponds to a primary route processor, to flood manager 722. Flood manager 722 optionally encrypts the contents by providing the contents to encryption/decryption manager 782 and receiving the encrypted contents therefrom. Flood manager 722 adds the common header and sequence number as described above, with a type code indicating the message type is a route processor announcement (in response to receipt of the message from routing assignment announcer 792) and provides the message to the neighbor nodes in the same pool.

When the flood managers 722 in the other nodes 722-726 in the pool receive the route processor announcement message, they will forward it to neighbor nodes in the same pool unless they originated it or it is already stored in their message storages 752. Flood manager 722 identifies the message type code and provides the message to routing assignment arbitrator 794. Routing assignment arbitrator 794 optionally passes the contents of the message to encryption/decryption manager 782 which optionally decrypts the contents as described above and provides the decrypted contents to routing assignment arbitrator 794. Routing assignment arbitrator 794 uses the contents to determine that the route announcement is a primary route assignment announcement for the specified border router 510A-E and compares the source identifier of the node assigned to be the primary route processor for that border router 510A-E in routing assignment storage 784 with the one it received in the message. If the message has the source identifier of a different node, if the source identifier from the message is higher (or lower in another embodiment) than the node assigned as the primary route processor for that border router 510A-E, routing assignment arbitrator 794 substitutes the source identifier in the message for the one in the table as the primary route processor for the border router 510A-E. This procedure serves to arbitrate conflicts in assignments.

Secondary routing assigner 790 receives the table from primary routing assigner 788 and repeats the process of building the upper bound and adjusted upper bound as described above with reference to primary routing assigner 788, and repeats the process of selecting a node using the hash result it receives in the manner performed by primary routing assigner 788 as described above. The source identifier of the selected node is assigned by secondary routing assigner 790 as the secondary node by adding it to the secondary node column of the table in routing assignment storage 784.

If the source identifier secondary node matches the source identifier of the node containing secondary routing assigner 790, secondary routing assigner 790 provides the message to route processor 730 and provides the IP address of the border router 510A-E to routing assignment announcer 792, which provides to flood manager 722 the contents of a route processor assignment message indicating the source identifier in the common header of the message is the secondary route processor for the border router similar to the route processor assignment message above, except that the message indicates that it corresponds to the secondary route processor.

Flood manager 722 encrypts the content of the route processor assignment message as described above adds a common header and sequence number and provides it as described above. The other nodes 522-526 in the pool process the message similar to that described above for the route processor assignment message, except that they use the secondary column in routing assignment storage 784.

If there is a conflict between either the primary or secondary route assignments made by different nodes, because each node that believes it is the primary or secondary route processor will send a route processor assignment message, the conflict will be resolved using any conventional conflict resolution technique, such as the one described above.

In one embodiment, the IP addresses of the border routers 51A-E, from which each of the nodes 520-538 in the various pools may receive routing information such as (E)BGP messages, are stored in system administration storage 714 as described above. At system startup, routing change manager 786 in each node 520-538 selects a border router from the list of border routers in system administration storage 714 for which no node 520-538 has been designated as the primary route processor in routing assignment storage 784 and signals primary routing assigner 788 with the IP address of the selected border router 510A-E. Primary routing assigner 788 performs the assignment of the primary route processor and initiates the performance of the secondary route processor for the selected border router 510A-E as described above. Routing change manager 786 then repeats this process until all routers on the list have been assigned a primary route processor and secondary route processor as described above.

BGP processor 230 can then initiate an (E)BGP session with the border router or border routers 520-538 for which it has been designated as the primary route processor. In one embodiment, BGP processor 230 retrieves the list of border routers 520-538 for which the node's address in system administration storage 714 matches the address assigned as the primary route processor in routing assignment storage 784 and initiates an (E)BGP session with each such router 510A-E that has not already initiated a session with it.

An (E)BGP session with a border router 510A-E may be initiated via a TCP/IP connection with that border router 510A-E. BGP processor 230 provides one or more packets to initiate the session to TCP manager 720 which provides the packets to communication interface 210. As described above, communication interface 210 may contain several interfaces: at least one is in connection with one or more pool selectors 512 and/or one or more nodes 520-538 in its pool, and at least one, which may be different from the first at least one, is able to communicate with the border routers 510A-510E, although the same physical interface may be used for both functions. When it receives a packet for one of the border routers 510A-E having an IP address in system administration storage 714, TCP manager 720 uses as the source IP address the IP address of the pool selector 512 or pool selectors if multiple pool selectors are used, and provides the message via TCP/IP. Responses from he border router 510A-E will be received by pool selector 512 and flooded as a data messages to nodes 520-538 as described in more detail below.

If BGP processor 230 cannot be modified to perform as described above, message transfer manager 796, may build a list of the border routers for which the node 520-538 is the primary route processor and provide it to BGP processor 230 as an initial list of border routers with which it should become an (E)BGP peer. BGP processor 230 will peer with such border routers via message director 732, which operates as message director 232 except as noted herein, and which checks the destination IP addresses in such messages, and if the IP addresses match the IP addresses of border routers 510A-E for which the node has been designated as the primary route processor, message director 232 passes such messages to TCP manager 720 for transmission as described above. At a later time, message transfer manager 796 passes the IP addresses of the border routers 510A-E for which the node has been designated as the secondary route processor as an additional list of border routers with which BGP processor 230 should become an (E)BGP peer. However, message director 732 suppresses any such outbound peering messages, and instead retrieves from message storage 752 the responses that were made to such peering messages sent by the primary route processor for that destination, optionally decrypts them via encryption/decryption manager 782 and reformats them as TCP/IP messages that it passes to BGP processor 230 as if the messages had been sent to it instead of the primary route processor. If the border router 510A-E for which the node is a secondary route processor initiates the connection first, message director 232 provides such messages from message storage 752 to BGP processor 230 as if they had been intended for it instead of the primary route processor node and suppresses any such responses made by BGP processor 232.

All (E)BGP messages received from border routers 510A-E are provided as data messages by pool selector 512 to the flood managers 722 of all of the nodes in the pool as described above and provided to message manager 750 for storage in message storage 752. The flood manager 722 will provide the message to neighbor nodes in the pool other than the node from which the message was received as described above. In addition, flood manager 722 passes the contents to message transfer manager 796, which decrypts the contents via encryption/decryption manager 782. Message transfer manager 796 looks up in routing assignment storage 784 the primary and secondary route processor for the border router to which the message corresponds. If the border router 510A-E to which the message corresponds has a primary or secondary route processor that matches the source identifier of the node in which message transfer manager 796 resides (as stored in system administration storage 714), message transfer manager 796 provides the content of the message to BGP processor 230 for processing as described above.

The node 510A corresponding to the primary route processor processes the messages as a conventional route processor and may send messages to the router or routers for which it is the primary route processor as described above and flood messages sent to the border routers 510A-E and other routing messages to the other nodes 510B-E in the pool. Messages provided to the router or to other destinations are provided via a TCP/IP connection via TCP manager 720 and input/output 208 of communication interface 210 as described above. This connection is not provided via pool selector 512 in one embodiment, although it may be provided by pool selector 512 intercepting and forwarding over a TCP/IP connection to the intended border router 510A-C messages flooded that have a certain type in other embodiments, either by providing the original header of the message to which the message is a response, or by pool selector 512 saving the state of each TCP/IP connection passed through it. All messages provided to TCP manager 220 are also sent to flood manager 622 (optionally encrypted via encryption/decryption manager 782) for flooding to the other nodes 520-538 in the pool. Other routing messages such as (I) BGP messages, may be flooded to all nodes 520-538, not just those in the pool.

Messages sent to other nodes are sent as the content of data messages to flood manager 722, which adds the common header and sequence number and encrypts the contents via encryption/decryption manager 782 and provides them to the message manager 750 for storage in message storage 752 and to neighbor nodes, which receive them and provide them to their neighbor nodes as described above.

In one embodiment, BGP processor 230 in the node corresponding to the secondary route processor may also attempt to send flood messages and TCP/IP messages to border routers for which it is the secondary route processor. In such embodiment, as described above, such messages are provided via message director 732, which checks in routing assignment storage 784 the IP address to which messages are being sent, and suppresses such messages if the sender's source identifier matches the secondary route processor of the destination of the message in the TCP/IP header. In other embodiments, secondary routing assigner 790 informs BGP processor 230 that it is the secondary route processor for the border router 510A-E if the source identifier for the secondary route processor matches that of the node 520 in which secondary routing assigner 790 resides, and BGP processor 230 itself suppresses messages that it would otherwise send to that border router 510A-E until it is no longer the secondary route processor (e.g. peer down manager 762 may instruct it that it is the primary route processor when peer down manager detects the previous node corresponding to the primary route processor has gone down, as described in more detail below). However, such messages are sent via flood manager 722 and stored in message storage 752 by message manager 750.

Peer down manager 762 performs the same functions as peer down manager 262 except as noted herein. In the event that a peer is detected as being down by peer down manager 762, in addition to performing the functions described above for peer down manager 262, peer down manager 762 identifies whether the peer that is down is a primary or secondary route processor.

If the peer detected as down is a primary route processor, peer down manager 762 will transfer the source identifier of the secondary route processor to become the primary route processor, and if the new primary route processor has a source identifier matching the node in which the peer down manager 762 exists, peer down manager 762 signals routing assignment announcer 792 with the IP address of the border router and an indication that it is the primary route processor. Routing assignment announcer 792 sends out a routing assignment message as described above.

Peer down manager 762 then signals secondary routing assigner 790, which builds a table similar to that described above that is built by primary routing assigner 788 that excludes the primary route processor for the border router 510A-E and selects a node as the secondary route processor as described above. If the new secondary route processor has a source identifier matching the node in which the peer down manager 762 exists, peer down manager 762 signals routing assignment announcer 792 with the IP address of the border router and an indication that it is the secondary route processor. Routing assignment announcer 792 sends out a routing assignment message as described above.

These procedures are repeated for every border router for which the peer down is a primary route processor.

If peer down manager 762 identifies that the peer down is a secondary route processor, in addition to performing the functions described above with respect to peer down manager 262, peer down manager 762 signals secondary routing assigner 790, which builds a table similar to that described above that is built by primary routing assigner 788 that excludes the primary route processor for the border router 510A-E and selects a node as the secondary route processor as described above.

If the new secondary route processor has a source identifier matching the node in which the peer down manager 762 exists, peer down manager 762 signals routing assignment announcer 792 with the IP address of the border router and an indication that it is the secondary route processor. Routing assignment announcer 792 sends out a routing assignment message as described above.

In one embodiment, to ensure continuity, when a node is converted from a secondary route processor to a primary route processor for a border router 510A-E, peer down manager 762 retrieves recent data messages corresponding to the border router for which the node had been acting as a secondary route processor from message storage 752 sent by the BGP processor 230 that was acting as a secondary route processor, decrypts them via encryption/decryption manager 782 and provides them to header manager 228. Header manager 228 removes the header information and converts the messages to TCP/IP packets and sends the packets to BGP processor 230 in the order in which they were received. BGP processor 230 sends them to the border router 510A-E for which it was the secondary route processor and now is the primary route processor to ensure that the messages were received. If the border router 510A-E received the messages from the previous primary route processor, it will discard any such corresponding ones sent in this manner. The activities above are performed for each border router for which a downed peer was the secondary route processor.

In one embodiment, when routing assignment arbitrator 794 receives the route processor announcement message for a secondary node as described above, if the IP address of the node in which routing assignment arbitrator 794 resides matches the IP address of the node newly designated as the primary route processor, routing assignment arbitrator 794 in the node that changes from a secondary route processor to a primary route processor will request from BGP processor 230 routing state information about the border router 510A-E that includes all routing information the node has regarding that border router 510A-E. BGP processor provides that information, which is provided to flood manager 722. Flood manager 722 optionally encrypts the contents via encryption/decryption manager 782 and adds a common header and sequence number with a type code indicating the message is a border router update message (because it was received by routing assignment arbitrator 794) and including the address of the border router to which the message corresponds and provides the message to the neighbor nodes in the same pool.

The flood managers 722 in the other node will optionally decrypt the message via encryption/decryption manager 782, provides the message for storage to message manager 750 and if it has not been received optionally reflood the message to other neighbor nodes in the pool other than the node from which the message was received. Additionally, because the message has the type of a border router update message, flood manager 722 sends it to message director 232. If the message has a source for which the node containing flood manager 722 has been newly designated as the secondary route processor, message director 232 either provides the contents of the message to BGP processor 230 or, if it is not possible to modify BGP processor 230 to accept such message, may provide one or more messages to BGP processor 230 that contain this information as if it had been sent by the border router via a new connection.

In one embodiment, a lightly loaded node may instruct a heavily loaded node that it wishes to take over as primary or secondary route processor from that node. Handoff manager scans the table in routing assignment storage 784 to determine the heaviest-loaded node and may also compare the most recent weight provided by weight manager of its own node with the most recent weight received from the other node, both of which are stored in message storage 752, to ensure that the addition of the route processing responsibilities will not cause it to have a heavier load than the node for which it is proposing taking over. Alternatively, or additionally, each handoff manager 799 may infrequently, but periodically, provide a load message with more detailed information such as RIB sizes of each connection for which their node is primary or secondary route processor, by encrypting it and providing it to flood manager 722 which treats it similarly to a data message, albeit with a different type, as described above. Periodically, handoff manager 799 computes the effect of such transfer and if the load on that node after the proposed transfer will not be higher than the load on the node from which the proposed transfer will be made, handoff manager 799 proposes the transfer via a proposed transfer message provided to flood manager 722 that is treated the same as a data message as described above, except that it has a unique type. The content of the transfer message identifies the source identifier of the node from which the transfer is requested, and the IP address of the border router corresponding to the transfer.

Each flood manager receiving the message will provide it to its handoff manager in response to the type of the message. The handoff manager 799 will optionally decrypt the message via encryption/decryption manager 782 and if it agrees to the transfer, will provide to flood manager 722 a transfer reply message, which is treated like a data message, though with a unique type, that identifies the node from which the request was received. In one embodiment, the transfer reply message will contain a refusal if the connection with the border router 510A-E that is the subject of the request has not been established for a sufficient amount of time to ensure the connection has moved beyond the startup phase. Otherwise, the transfer reply message will contain sufficient information to ensure the synchronization of the BGP state in the BGP processor 230 for the border router 510A-E that is the subject of the request, and the identifier of that border router and the source identifier of the node that sent the request.

The handoff manager 799 in the other border router will receive the message from flood manager 722, optionally decrypt it via encryption/decryption manager 782 as described above, and if it has the same source identifier as the node in which handoff manager 799 resides, handoff manager 799 will provide the BGP information to BGP processor 230, which uses it to operate the connection.

Handoff manager 799 in the former route processor provides a transfer message to handoff managers 799 in other nodes 520-526 in the pool via flood manager 722 that treats it as a data message with a different type identifier. The transfer message indicates the IP address of the border router 510A-E being transferred and the source identifier of the node 520-526 that requested the transfer, and handoff managers 799 substitute in routing assignment storage 784 the source identifier of the node to which the route processing responsibilities are being transferred for those of the node sending the transfer message for the border router contained in the message, and handoff manager 799 in the node sending the transfer message similarly updates its routing assignment storage 784 and instructs BGP processor 230 to cease it's route processing activities for that border router.

In one embodiment, if a new neighbor is discovered or entered, the new node will send the existing node a dump_cur_state message to be updated with the current state of the existing node. The existing node will provide a list of all of the nodes in the network in the same pool, their most recently advertised weights, the table in routing assignment storage 784 and the most recent sequence number of the last message received from the nodes in the same pool.

In one embodiment, certain security measures are employed by flood managers 722. These include ensuring that the load messages indicate increased loads by nodes that have added route processing activities for one or more border routers 510A-E, explicitly acknowledging receipt of a message received from another flood manager 722 in another node 520-538, and refusing to forward to its neighbors more than a certain number of a certain type of message or any type of message received from the same source during a certain period.

Figure 8:
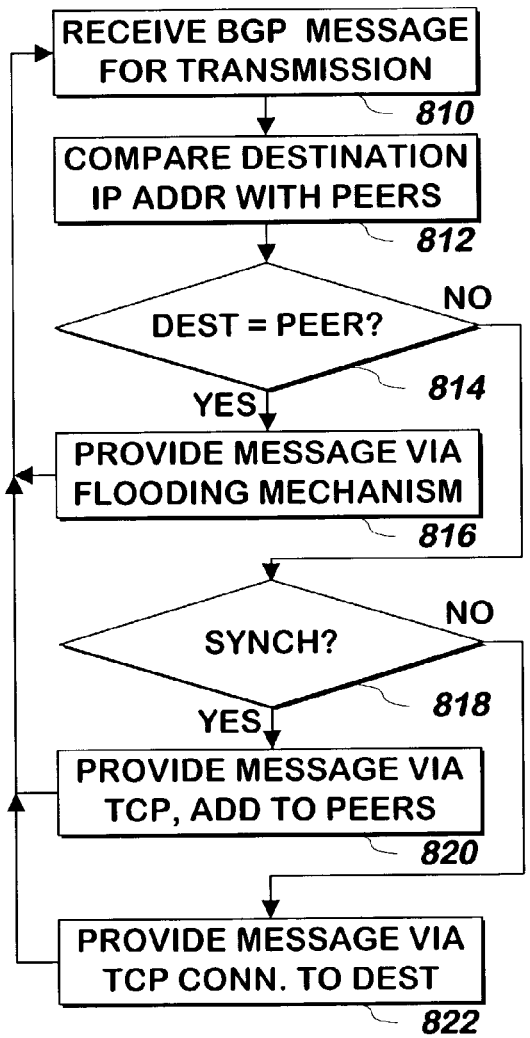
FIG. 8 is a flowchart illustrating a method of communicating routing information such as (I) BGP or (E)BGP information according to one embodiment of the present invention.

Referring now to FIG. 8, a method of communicating routing information such as (I) BGP information or (E)BGP information is shown according to one embodiment of the present invention. BGP is used as an example, but any routing information may be used. A BGP message is received 810 for transmission. The destination IP address of the message is compared 812 with a list of peers, and if the destination is on the list 814, the message is provided 816 via a flooding mechanism as described above. Otherwise 814, if the message is a synch message (and a synch message has been received from the destination) as described above 818, the message is sent via a TCP/IP connection and the destination of the message is added to the list of peers 820 and the method continues at step 810. If the message is not a synch message 818, the message is provided 822 via a TCP/IP connection, which may be initiated if one does not exist, and the method continues at step 810.

Figure 9:
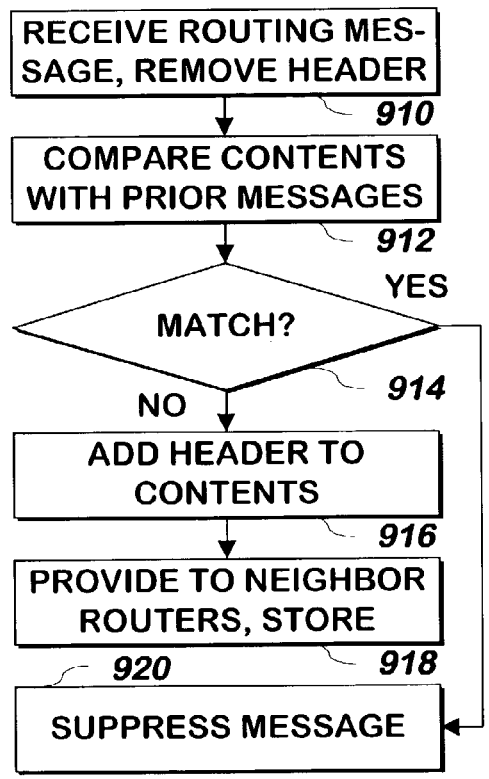
FIG. 9 is a flowchart illustrating a method of providing (I) BGP, (E)BGP or other routing messages according to one embodiment of the present invention.

Referring now to FIG. 9, a method of providing (I) BGP, (E)BGP or other routing messages is shown according to one embodiment of the present invention. An (I) BGP or (E)BGP or other routing message is received for transmission from a device and the TCP/IP header of the message is removed 910. The contents of the message are compared with the contents of prior messages containing (I) BGP or (E)BGP or other routing message contents sent by the device. If the contents of the message received in step 910 do not match one of the contents sent 914, a header is added 916 to the message as described above and the message is sent 918 to the neighbor routers of the device and the message is stored as described above. If a match occurs 914, the message is suppressed 920.

Figure 10:
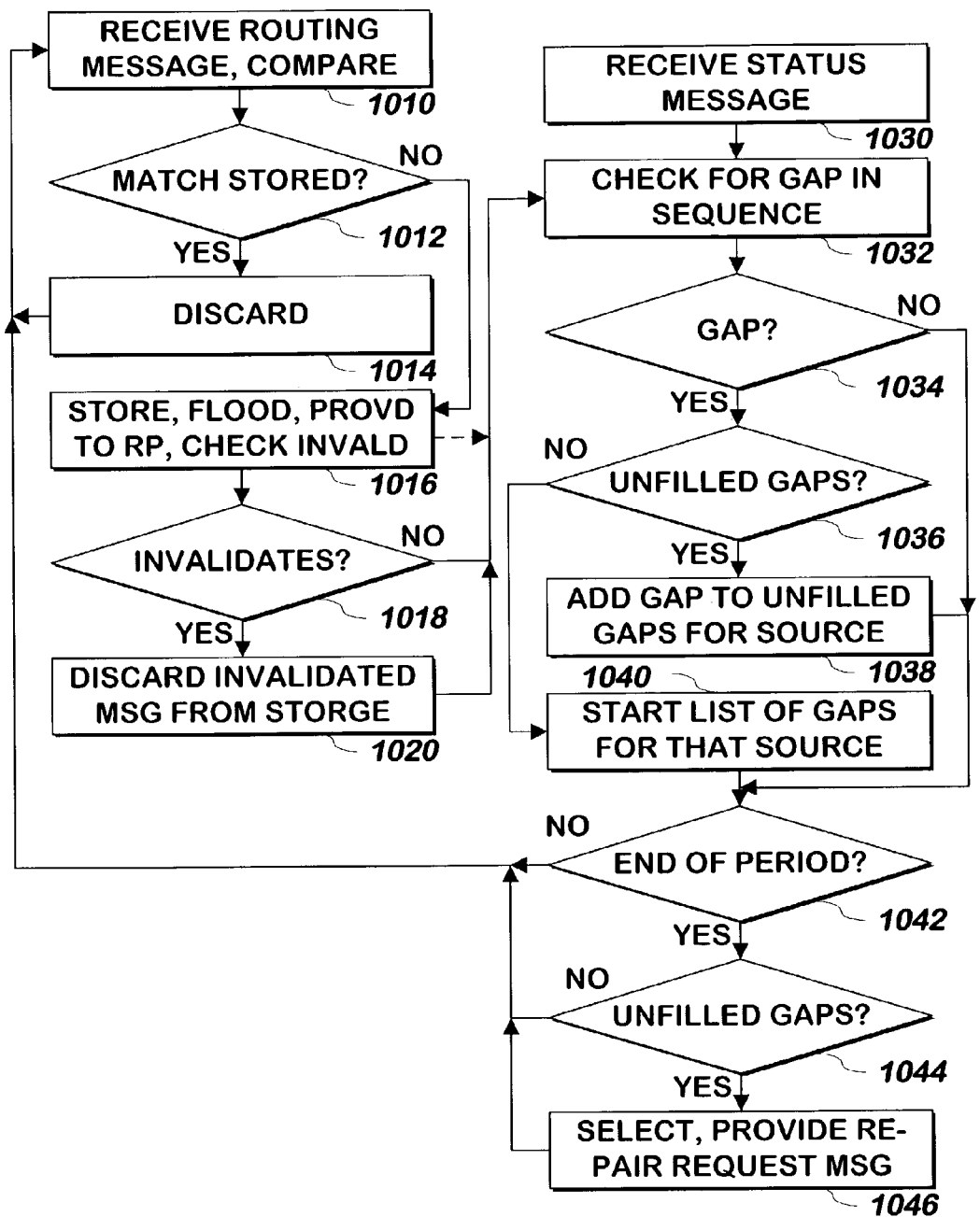
FIG. 10 is a flowchart illustrating a method of receiving (I) BGP, (E)BGP or other routing messages and responding to a status message according to one embodiment of the present invention.

Referring now to FIG. 10, a method of receiving (I) BGP, (E)BGP or other routing messages and responding to a status message is shown according to one embodiment of the present invention. A routing message is received from an external source and the contents of the message compared with contents of messages stored that were received from the same source 1010. If the contents match 1012, the message is discarded 1014 and otherwise 1012, the message is stored and flooded as described above 1016.

In one embodiment, the contents of the message received in step 1010 are optionally checked to determine if they invalidate a prior stored message from the same source 1016. If they do 1018, the invalidated message is discarded from storage 1020 and otherwise (or if the contents of the message are not checked), the method continues at step 1032. In another embodiment, the check for invalidity in step 1016 and steps 1018-1020 are not performed, and step 1032 follows the remainder of step 1016 as shown by the dashed line in the Figure.

At step 1032, the message received in step 1010, is checked to identify whether a gap exists in the messages received from that source as described above. If such a gap exists 1034, if there are other unfilled gaps for that source 1036, the detected gap is added 1038 to the gaps as described above and the method continues at step 1042, and otherwise 1036 a new set of gaps for that source is created 1040 and the method continues at step 1042. If the message does not indicate such a gap 1034, the method continues at step 1042.

At step 1042, if the end of the repair request period has elapsed from the last time a repair request message was sent, as described above, if there are unfilled gaps 1044, a source having unfilled gaps is selected and a repair request message is generated and provided for that source as described above 1046 and the method continues at step 1010 and otherwise 1044, the method continues at step 1040. If the period has not ended 1040, the method continues at step 1040.

In one embodiment, step 1032 also follows the receipt of a status message 1030 as described herein.

Figure 11:
FIG. 11 is a flowchart illustrating a method of responding to a repair request message according to one embodiment of the present invention.

Referring now to FIG. 11, a method of responding to a repair request message is shown according to one embodiment of the present invention. An (I) BGP or (E)BGP or other routing message is received from a first device over a network and the message is stored 1110. A message requesting information, such as a repair request message as described above, is received from a second device 1112. A response to the message received in step 1112 is provided 1114 using the information received in step 1110.

Figure 12:
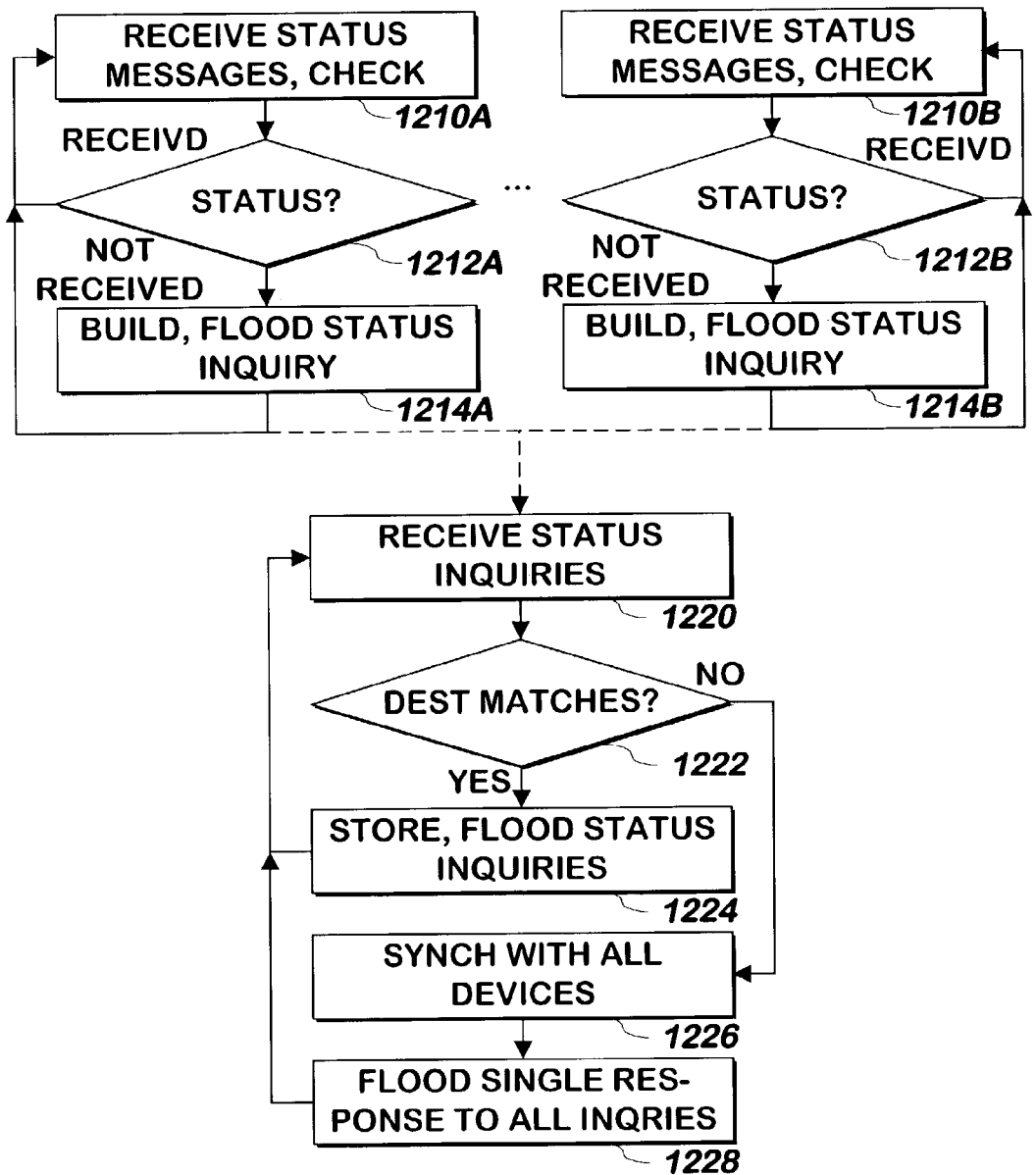
FIG. 12 is a flowchart illustrating a method of reestablishing synchronization between a destination device and several requesting devices according to one embodiment of the present invention.

Referring now to FIG. 12 a method of reestablishing synchronization between a destination device and several requesting devices is shown according to one embodiment of the present invention.

At one of the requesting devices, the steps 1210A-1214A are performed. Status messages are received and timestamped and a check is made against the latest timestamps of all status messages received from devices with which a peering relationship has been established 1210A as described above. If at least one of the peers has not sent a status message within a period of time 1212A, the method continues at step 1214A and otherwise 1212A, the method continues at step 1210A. At step 1214, one or more status inquiries with destinations corresponding to the devices from which status messages had not been received are generated and flooded as described above and the method continues at step 1210A.

Steps 1210B through 1214B, identical or similar to steps 1210A-1214A are performed on a different device coupled to the device that performs steps 1210A-1214A via a network and may be performed at the same or at different times. There may be other devices that also perform, at the same or different times, steps similar or identical to steps 1210A-1214A as indicated by the ellipses between steps 1210A-1214A and 1210B-1214B.

Steps 1220-1228 are performed by the device for which a status message had not been received in the period, and by other devices in the network. Such device and devices are coupled to one another and to the devices performing steps 1210A-1214A and 1210B-1214B via the network.

The status inquiries from steps 1214A and 1214B are received 1220 over the network. If the destination specified in the status inquiry message matches 1222 the destination of the device performing steps 1220-1228, the device internally synchronizes 1226 with all devices from which status messages were received, and floods a number of status inquiry responses that is less than the number of status inquiries received, such as a single response to all such status inquiries 1228 and the method continues at step 1220. Otherwise 1222, the status inquiry messages are flooded 1224 as described above and the method continues at step 1220. In this manner, synchronization is performed without sending messages individually to all devices that request it.

Figure 13:
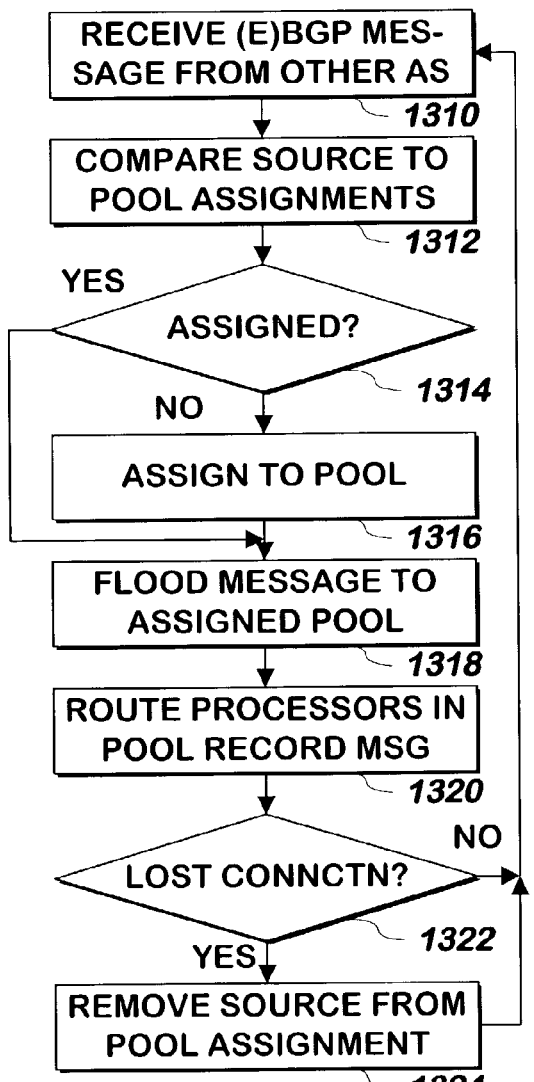
FIG. 13 is a flowchart illustrating a method of distributing (E)BGP messages according to one embodiment of the present invention.

Referring now to FIG. 13, a method of distributing (E)BGP messages is shown according to one embodiment of the present invention. At one AS, an (E)BGP message is received 1310 from another AS. The source of the (E)BGP message is compared 1312 against a list of pool assignments. If the source has not been assigned to a pool 1314, the source is assigned 1316 to a pool as described above and the method continues at step 1318 and otherwise 1314, the method continues at step 1318.

At step 1318, the message received in step 1310 is flooded to the pool of at least two route processors assigned to the source of the message, and at least two of the at least two route processors store 1320 the message.

If a connection to a source assigned to a pool is detected to have been lost 1322, the source is removed 1324 from the pool assignments and the method continues at step 1310, and otherwise 1322, the method continues at step 1310.

Referring now to FIG. 14, a method of processing (E)BGP messages is shown according to one embodiment of the present invention. An (E)BGP message is received 1410 from another AS and flooded 1412 to a pool of route processors, for example using the method described in FIG. 13. Steps 1410 and 1412 may be part of an independently running process in which step 1410 follows step 1412.

Each route processor in the pool identifies a weight indicating the load for that route processor as described above and floods the identified weight to the other route processors in the set as described above 1414. Step 1414 may be part of an independently running process in each route processor.

Each route processor in the pool receives 1416 the weights flooded by the other route processors in the pool as described above as part of an independently running, repeating process.

Steps 1412-1434 are performed by each route processor in the pool. A route processor in the pool receives all messages flooded to the pool as described above in step 1412 and stores 1420 them as described above. If the source of the messages is new 1422, the route processor selects a primary route processor 1424 and a secondary route processor 1426 for the new source using the weights received in step 1416 as described above. Steps 1424 and 1426 may involve the transmission of an announcement from the selected route processors and the resolution of conflicts should they occur as described above. If the source of the messages is not new 1422, the method continues at step 1428.

If the route processor performing an instance of the method was selected as the primary route processor 1428, it processes the message received as a conventional route processor 1430, which may include responding to the source of the message and processed route information, and the method continues at step 1420. Otherwise 1428, if the route processor is selected as a secondary route processor 1432, it may process the message as a conventional route processor, but either it will not provide processed routing information or responses to the source or they will be suppressed as described above 1434 and the method continues at step 1420. Otherwise 1432, the method continues at step 1420.

Figure 15:
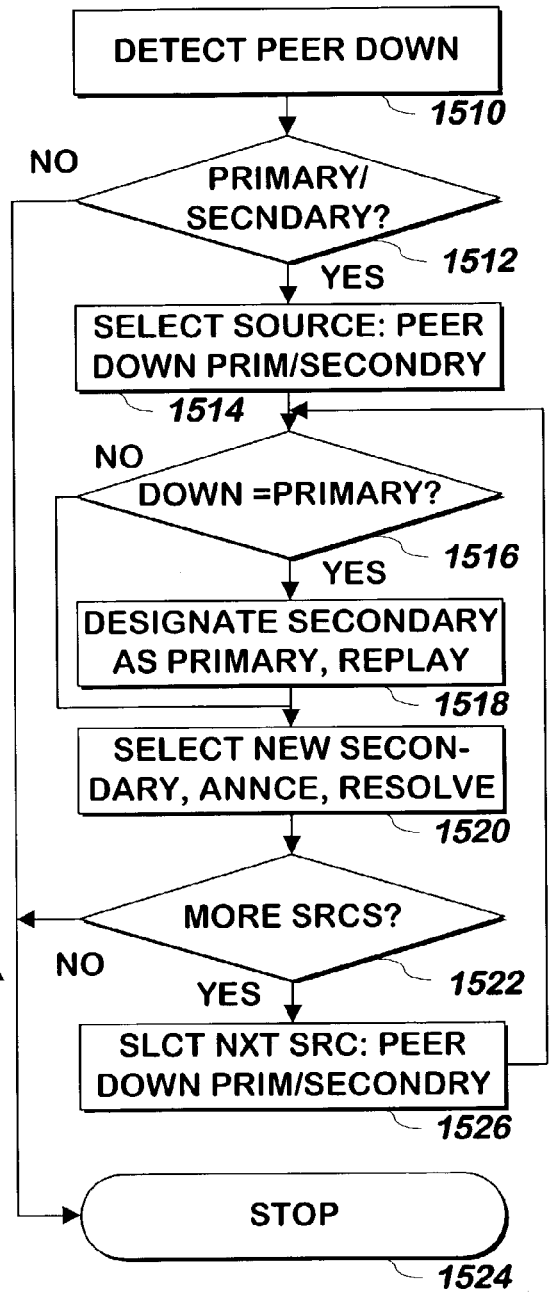
FIG. 15 is a flowchart illustrating a method of responding to a downed route processor according to one embodiment of the present invention.

Referring now to FIG. 15, a method of responding to a downed route processor is shown according to one embodiment of the present invention. The steps of FIG. 15 may be performed by each of the route processors in the pool containing the downed route processor. One of the route processors in the set may be detected 1510 as down as described above. If the downed route processor was a primary or secondary route processor for any source 1512, the method continues at step 1514 and otherwise 1512, the method terminates 1524.

At step 1514 a source for which the downed route processor was a primary or secondary route processor is selected, and if the downed route processor was the primary route processor for the selected source 1516, the secondary route processor for the selected source is designated as the primary route processor for the selected source 1518, and the method continues at step 1520. Step 1518 may include announcing, by the newly designated primary route processor, the new designation, and retrieving from storage the most recent messages received that were sent to the source by the formerly-designated primary route processor, and resending them to ensure they were received. In such embodiment, messages are flooded as described above before they are sent via a TCP/IP connection to ensure that such messages will be received by the secondary route processor if the primary route processor fails. Otherwise 1516, the method continues at step 1520.

At step 1520, a new secondary route processor is selected and announced by that route processor and any conflicts are resolved as described above and if there are more unselected sources for which the downed route processor was the primary or secondary route processor 1522, the next such unselected source is selected 1526 and the method continues at step 1516 and otherwise 1522, the method terminates 1524.

Figure 16:
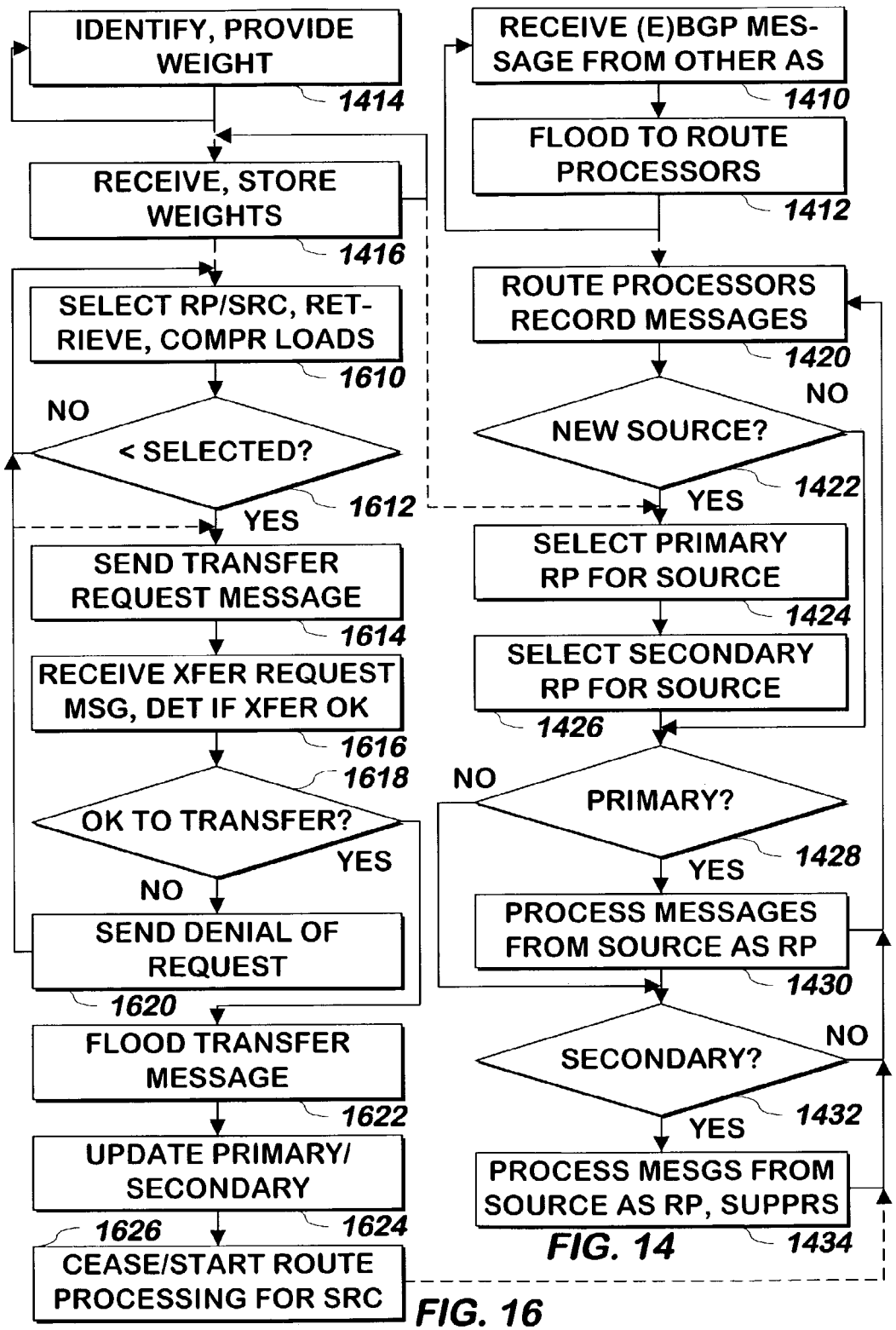
FIG. 16 is a flowchart illustrating a method of transferring a designation of primary or secondary route processor according to one embodiment of the present invention.

Referring again to FIG. 16, a method of transferring a designation of primary or secondary route processor is shown according to one embodiment of the present invention. A route processor selects another route processor in its pool that is designated as a primary or secondary route processor and selects one of the sources for which the selected route processor is designated as a primary or secondary route processor and compares 1610 its load with the load of the selected route processor, for example using the weights received in step 1416 of FIG. 14 as shown by the dashed line in the Figure. If the route processor's load is less than the load of the selected route processor 1612, the route processor floods a transfer request, including the selected source, to the selected route processor 1614 and the method continues at step 1616. Otherwise 1612, it selects another route processor/source pair and continues using the selected route processor and source 1610.

At step 1616, the selected route processor receives the transfer request message and determines whether the transfer may take place as described above. If not 1618, the selected route processor sends a denial of the request 1620 and the route processor that sent the request selects another route processor and source pair and repeats the process from step 1610 or repeats the process for the same route processor and source at a later time as indicated by the dashed line in the Figure. Otherwise 1618, a transfer message, including an identifier of the route processor and an identifier of the source, is flooded 1622 by the selected route processor to all of the other route processors in the pool and all of the route processors substitute the route processor as the primary or secondary route processor for the source in place of the originator of the transfer message.

The selected route processor ceases, and the route processor starts and continues, to process (E)BGP messages as the route processor for the selected source 1626. The method may continue at step 1420 of FIG. 14 as shown by the dashed line in the Figure.

In one embodiment, pool selector 510 has one or more routable IP addresses that border routers 510A-E use to communicate with pool selector 512. However, nodes 520-538 have unrouteable addresses, addresses that are unreachable from another AS.

BGP handler 630 checks the format of messages it receives from sources that identify themselves as a border router 510A-E to ensure that the format of the message is a valid format (e.g. is in the format of an (E)BGP message) and the message has the form expected (e.g. proper protocol, and/or port) and cannot be used to gain access to any of nodes 520-538 before it provides any message for flooding to the proper pool as described above. Other conventional firewall processing methods may be used by BGP handler 630 in one embodiment.

Figure 17:
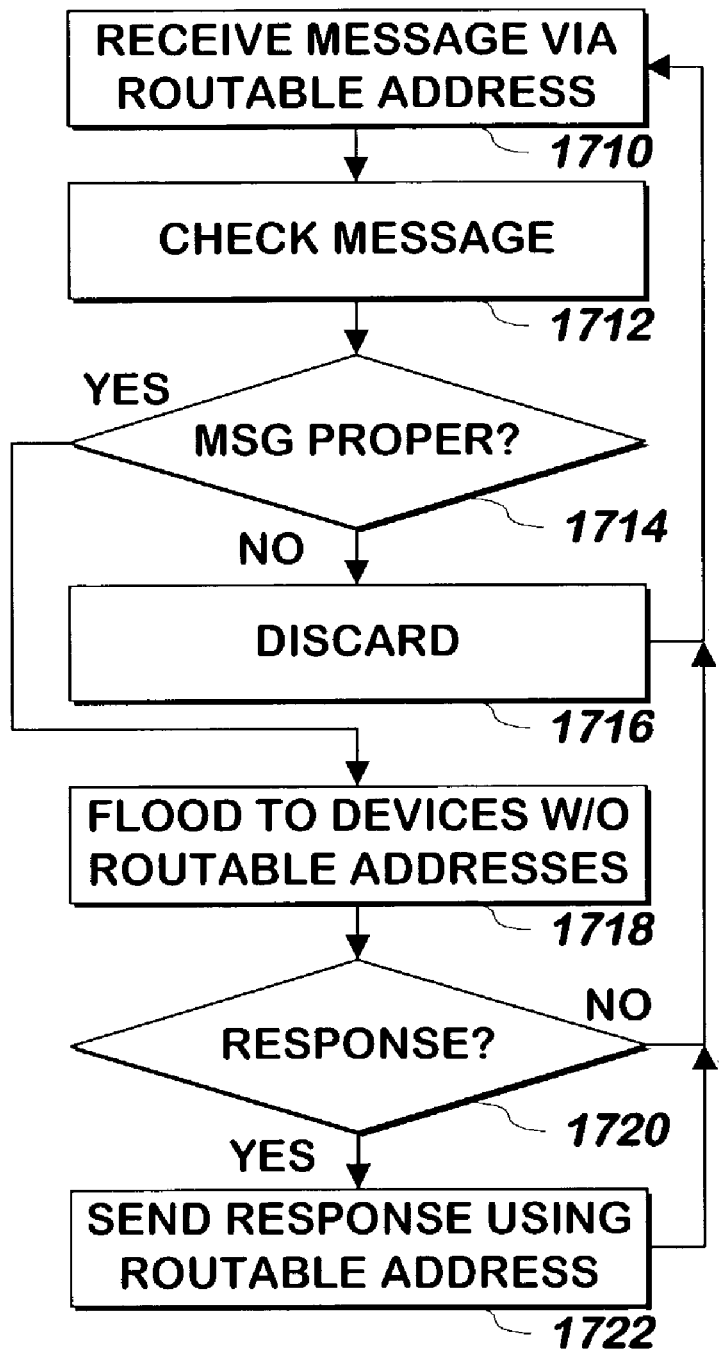
FIG. 17 is a flowchart illustrating a method of forwarding BGP messages from border routers to route processors according to one embodiment of the present invention.

Referring now to FIG. 17, a method of forwarding BGP messages from border routers to route processors is shown according to one embodiment of the present invention. Routing information such as an (E)BGP message is received 1710 by a device that has a routable address. The information is checked 1712 as described above to ensure the information is contained in a message having a particular format and information as described above. If the message has an improper format or is other than what is expected as a routing message 1714, the message is discarded 1716 and the method continues at step 1710. Otherwise 1714, the message is flooded 1718 over a network to a pool of route processors or other devices that have addresses that are not routable outside of the autonomous system in which the pool of devices resides as described above. If a response to the message is warranted 1720, one or more messages provided in response to the message received in step 1710 are provided 1722, either from the device without the routable IP address or from the device with the routable IP address, using the routable IP address as a source IP address.

What is claimed is:

1. A method of receiving a packet comprising routing information, the method comprising:
   receiving the packet comprising routing information at a first device having a routable address;
   verifying at least a portion of the packet against at least one expectation;
   responsive to the verifying step, providing over a network comprising an autonomous system that is coupled to at least one other autonomous system, information from the verified packet to at least one second device by providing said information into the network addressed with an unroutable address.

2. The method of claim 1 wherein the routing information comprise BGP information.

3. The method of claim 1 wherein the expectation comprises a format.

4. The method of claim 1 wherein the expectation comprises an absence of content that could be used in an attack.

5. The method of claim 1 wherein the expectation comprises a port.

6. The method of claim 1 wherein the providing step comprises flooding the information from the verified packet to a plurality of second devices, each having an unroutable address.

7. A system for receiving a packet comprising routing information, the system comprising, at a first device:
   a first communication means having an input operatively coupled for receiving the packet comprising routing information having a routable address, the first communication means for providing at least a portion of the packet at an output;
   a handler having an input coupled to the first communication means output for receiving the at least the portion of the packet, the handler for verifying at least some of the portion of the packet against at least one expectation and for providing information from the verified at least the portion of the packet at an output responsive to said verification;
 a second communication means having an input coupled to the handler output for receiving the information from the verified at least the portion of the packet, the second communication means for providing at an output coupled to a network comprising an autonomous system that is coupled to at least one other autonomous system, information from the verified at least the portion of the packet to at least one second device by providing said information from the verified at least the portion of the packet into the network addressed with an unroutable address.

8. The system of claim 7 wherein the routing information comprise BGP information.

9. The system of claim 7 wherein the expectation comprises a format.

10. The system of claim 7 wherein the expectation comprises an absence of content that could be used in an attack.

11. The system of claim 7 wherein the expectation comprises at least one port.

12. The system of claim 7 wherein the second communication means provides the information by flooding the information to a plurality of second devices, each having an unroutable address.

13. A computer program product comprising a computer useable medium having computer readable program code embodied therein for receiving a packet comprising routing information, the computer program product comprising computer readable program code devices which, when executed by at least one computer, cause the at least one computer to:
 receive the packet comprising routing information at a first device having a routable address;
 verify at least a portion of the packet against at least one expectation;
 responsive to the computer readable program code devices which, when executed by the at least one computer, cause the at least one computer to verify, provide over a network comprising an autonomous system that is coupled to at least one other autonomous system, information from the verified packet to at least one second device by providing said information into the network addressed with an unroutable address.

14. The computer program product of claim 13 wherein the routing information comprise BGP information.

15. The computer program product of claim 13 wherein the expectation comprises a format.

16. The computer program product of claim 13 wherein the expectation comprises an absence of content that could be used in an attack.

17. The computer program product of claim 13 wherein the expectation comprises a port.

18. The computer program product of claim 13 wherein the computer readable program code devices which, when executed by the at least one computer, cause the at least one computer to provide comprise computer readable program code devices configured to cause the at least one computer to flood the information from the verified packet to a plurality of second devices, each having an unroutable address.

\* \* \* \* \*